US006979920B2

(12) United States Patent
Reynolds et al.

(10) Patent No.: US 6,979,920 B2
(45) Date of Patent: Dec. 27, 2005

(54) CIRCULATION HOUSING FOR A MOVER

(75) Inventors: Ed Reynolds, Foster City, CA (US); Andrew J. Hazelton, San Carlos, CA (US); Michael Binnard, Belmont, CA (US)

(73) Assignee: Nikon Corporation, (JP)

( * ) Notice: Subject to any disclaimer, the term of this patent is extended or adjusted under 35 U.S.C. 154(b) by 0 days.

(21) Appl. No.: 10/769,307

(22) Filed: Jan. 30, 2004

(65) Prior Publication Data
US 2005/0168075 A1 Aug. 4, 2005

(51) Int. Cl.[7] .......................... H02K 9/19; H02K 41/02
(52) U.S. Cl. .......................... 310/54; 310/12; 310/52; 310/58; 310/64
(58) Field of Search .................. 310/12–14, 16–17, 310/52, 54, 58, 64

(56) References Cited

U.S. PATENT DOCUMENTS

| | | | |
|---|---|---|---|
| 3,855,485 A | 12/1974 | Matsui et al. | |
| 4,243,899 A | 1/1981 | Jaffe | |
| 4,460,855 A | 7/1984 | Kelly | |
| 4,625,132 A | 11/1986 | Chitayat | |
| 5,138,206 A | 8/1992 | Schmidt | |
| 5,157,296 A | 10/1992 | Trumper | |
| 5,196,754 A | 3/1993 | Berthold et al. | |
| 5,294,854 A | 3/1994 | Trumper | |
| 5,699,621 A | 12/1997 | Trumper et al. | |
| 5,777,403 A | 7/1998 | Yuan | |
| 5,783,877 A * | 7/1998 | Chitayat | 310/12 |
| 5,959,732 A | 9/1999 | Hara et al. | |
| 5,998,889 A | 12/1999 | Novak | |
| 6,069,417 A | 5/2000 | Yuan et al. | |
| 6,084,319 A * | 7/2000 | Kamata et al. | 310/12 |
| 6,114,781 A | 9/2000 | Hazelton et al. | |
| 6,130,517 A | 10/2000 | Yuan et al. | |
| 6,278,203 B1 | 8/2001 | Novak et al. | |
| 6,285,097 B1 * | 9/2001 | Hazelton et al. | 310/12 |
| 6,323,567 B1 | 11/2001 | Hazelton et al. | |
| 6,555,936 B1 * | 4/2003 | Tanaka et al. | 310/12 |
| 6,717,295 B2 * | 4/2004 | Hwang et al. | 310/12 |

FOREIGN PATENT DOCUMENTS

| | | |
|---|---|---|
| EP | 1124160 A2 | 8/2001 |
| JP | 05-45102 | 8/1989 |
| JP | 06-062788 | 1/1993 |
| JP | 05-262222 | 10/1993 |

(Continued)

OTHER PUBLICATIONS

Partial Translation WO2004/091079 pp. 4-8 and 12, Oct. 2004.*

(Continued)

*Primary Examiner*—Burton Mullins
(74) *Attorney, Agent, or Firm*—Steven G. Roeder; Jim Rose

(57) ABSTRACT

A mover (36) for an exposure apparatus (10) includes a conductor array (358) and a circulation housing (362) that defines at least a portion of a fluid passageway (364) near the conductor array (358). The circulation housing (362) includes a wall (366A) having a wall thickness. In one embodiment, the wall thickness at a first position on the wall (366A) is different than the wall thickness at a second position on the wall (366A). The wall (366A) can be curved and the shape of the curve is different at the first position than at the second position. Further, a cross-sectional shape of the wall (366A) at the first position is different from a cross-sectional shape of the wall (366A) at the second position.

88 Claims, 15 Drawing Sheets

FOREIGN PATENT DOCUMENTS

| | | |
|---|---|---|
| JP | 10-313566 | 11/1998 |
| JP | 2001-025227 | 1/2001 |
| JP | 2001-275334 | 10/2001 |
| JP | 2002-10618 | 1/2002 |
| JP | 2002-27730 | 1/2002 |
| JP | 2002-301742 | 10/2002 |
| WO | WO 2004/091079 | 10/2004 |

OTHER PUBLICATIONS

U.S. Appl. No. 09/139,954, filed Aug. 25, 1998, Teng et al.

* cited by examiner

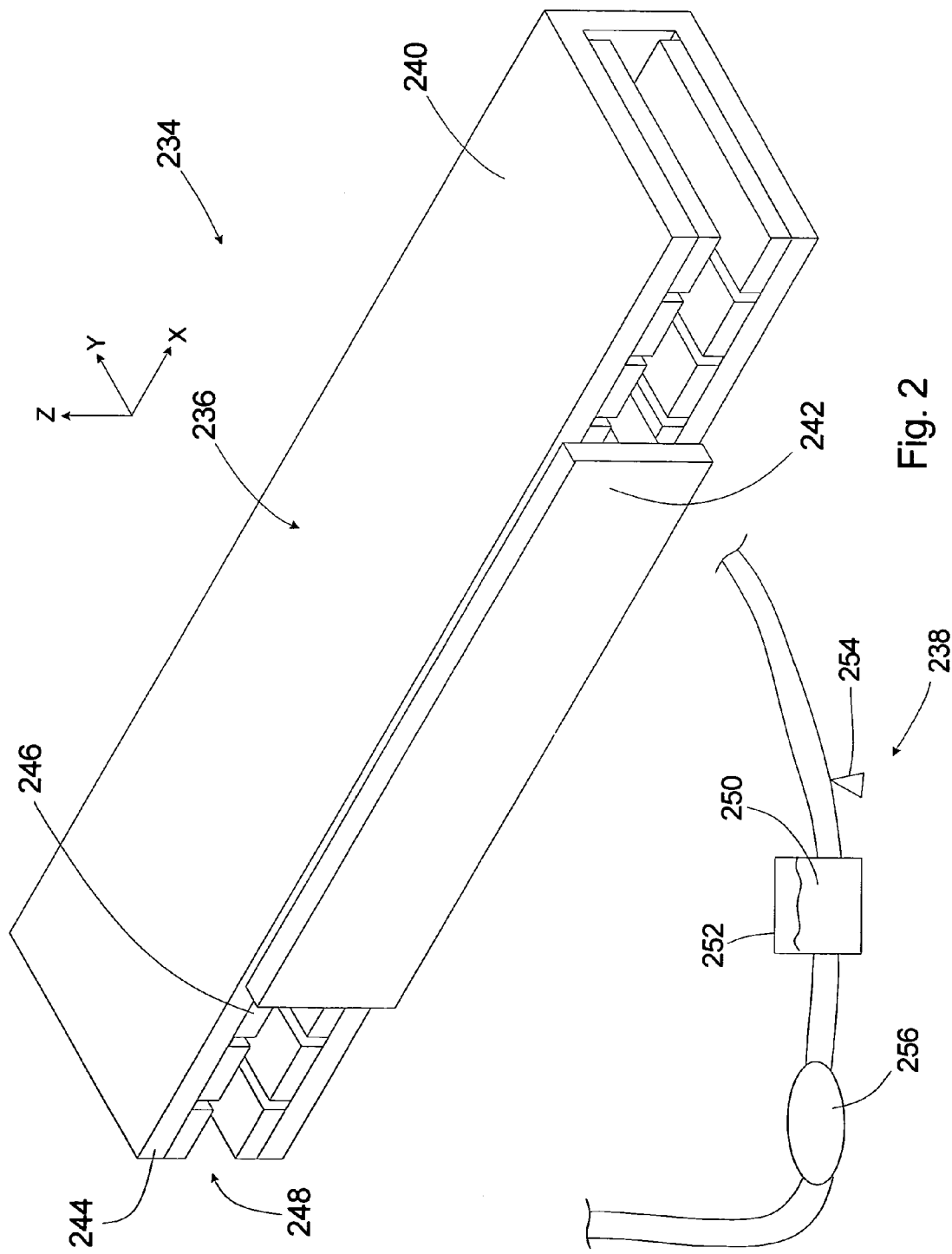

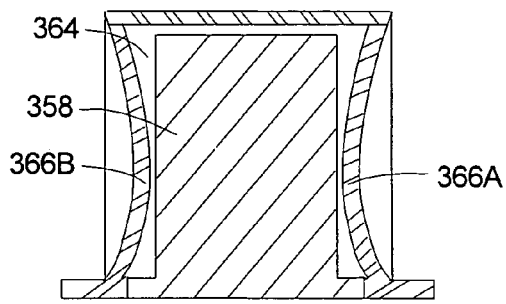
Fig. 3I
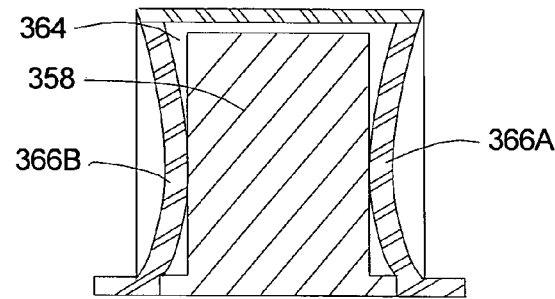
Fig. 3J
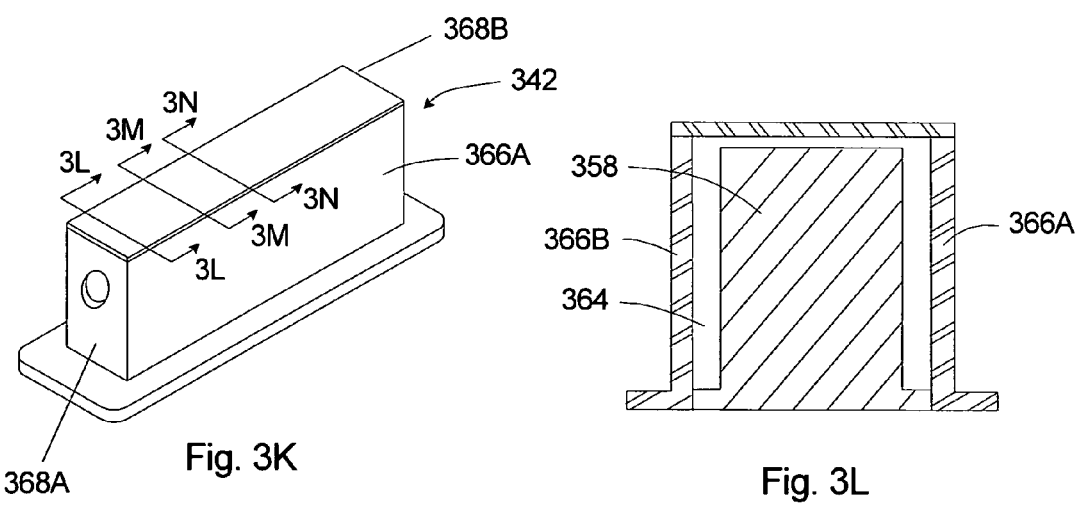
Fig. 3K
Fig. 3L

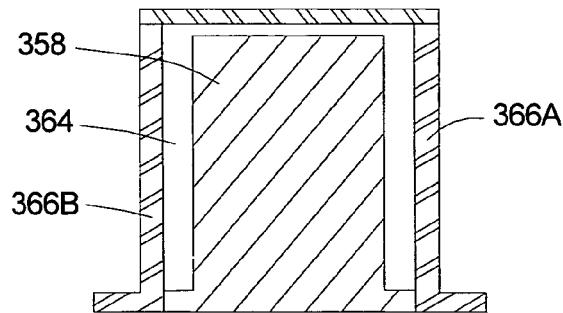
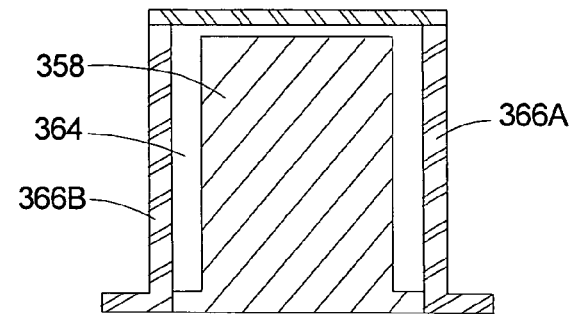
Fig. 3M          Fig. 3N
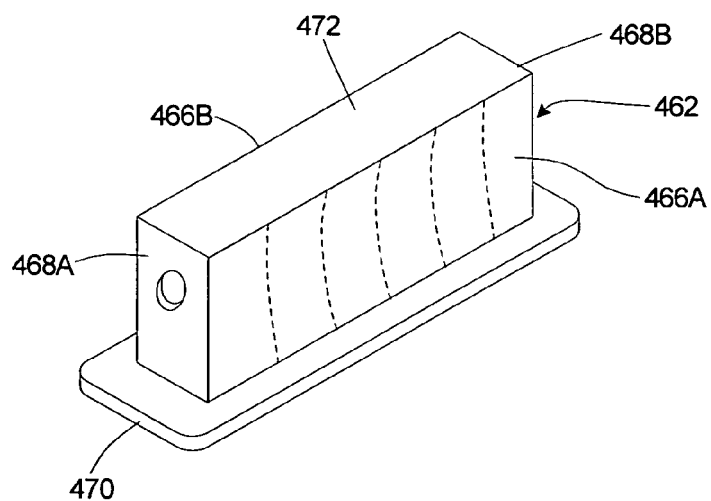
Fig. 4

CIRCULATION HOUSING FOR A MOVER

FIELD OF THE INVENTION

The present invention relates to a circulation housing for a mover. The circulation housing can be used with a circulation system for controlling the influence of the mover on the temperature of the surrounding environment and the surrounding components.

BACKGROUND

Exposure apparatuses for semiconductor processing are commonly used to transfer images from a reticle onto a semiconductor wafer. Typically, the exposure apparatus utilizes one or more movers to precisely position a wafer stage holding the semiconductor wafer and a reticle stage retaining the reticle. Additionally, the exposure apparatus can include a vibration isolation system that includes one or more movers. The images transferred onto the wafer from the reticle are extremely small. Accordingly, the precise positioning of the wafer and the reticle is critical to the manufacturing of the wafer. In order to obtain precise relative alignment, the position of the reticle and the wafer are constantly monitored by a measurement system. Subsequently, with the information from the measurement system, the reticle and/or wafer are moved by the one or more movers to obtain relative alignment.

One type of mover is a linear motor that includes a pair of spaced apart magnet arrays that generate a magnetic field and a conductor array positioned between the magnet arrays. Electrical current is directed to the conductor array. This causes the conductor array to move relative to the magnet arrays.

Unfortunately, the electrical current supplied to the conductor array also generates heat, due to resistance in the conductor array. Most linear movers are not actively cooled. Thus, the heat from the conductor array is subsequently transferred to the surrounding environment, including the air surrounding the linear motor and the other components positioned near the linear motor. The heat changes the index of refraction of the surrounding air. This reduces the accuracy of the measurement system and degrades machine positioning accuracy. Further, the heat causes expansion of the other components of the machine. This further degrades the accuracy of the machine. Moreover, the resistance of the conductor array increases as temperature increases. This exacerbates the heating problem and reduces the performance and life of the linear motor.

SUMMARY

The present invention is directed to a mover that includes a conductor array and a circulation housing that defines at least a portion of a fluid passageway near the conductor array. The circulation housing includes a wall having a wall thickness. In one embodiment, the wall thickness at a first position on the wall is different than the wall thickness at a second position on the wall. In alternative embodiments, for example, the wall thickness at the first position is at least approximately 300, 400, 500, 700, 900 or 1000 microns different from the wall thickness at the second position.

In another embodiment, the wall includes a curved region and the shape of the curve is different at the first position than at the second position. For example, the wall can include a first end and a second end. In one embodiment, the wall is substantially straight at the first end and curved intermediate the ends. Further, a cross-sectional shape of the wall at the first position can be different from a cross-sectional shape of the wall at the second position.

The present invention is also directed to a mover combination that includes the mover described above and a circulation system that directs a fluid to the fluid passageway. In one embodiment, the circulation system controls the rate of flow of fluid to the fluid passageway so that the wall is deflected and an outer surface of the wall is substantially planar.

The present invention is also directed to (i) an isolation system including the mover combination, (ii) a stage assembly including the mover combination, (iii) an exposure apparatus including the mover combination, and (iv) an object or wafer on which an image has been formed by the exposure apparatus. Further, the present invention is also directed to (i) a method for making a mover combination, (ii) a method for making a stage assembly, (iii) a method for manufacturing an exposure apparatus, and (iv) a method for manufacturing an object or a wafer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is a perspective view of a mover combination having features of the present invention;

FIG. 3I is a cut-away view taken on line 3I—3I in FIG. 3G;

FIG. 3J is a cut-away view taken on line 3J—3J in FIG. 3G;

FIG. 3K is a perspective illustration of the conductor component of FIG. 3G when fluid is directed to the conductor component;

FIG. 3L is a cut-away view taken on line 3L—3L in FIG. 3K;

FIG. 3M is a cut-away view taken on line 3M—3M in FIG. 3K;

FIG. 3N is a cut-away view taken on line 3N—3N in FIG. 3K;

FIG. 4 is a perspective view of another embodiment of a circulation housing having features of the present invention;

DESCRIPTION

Figure 1:
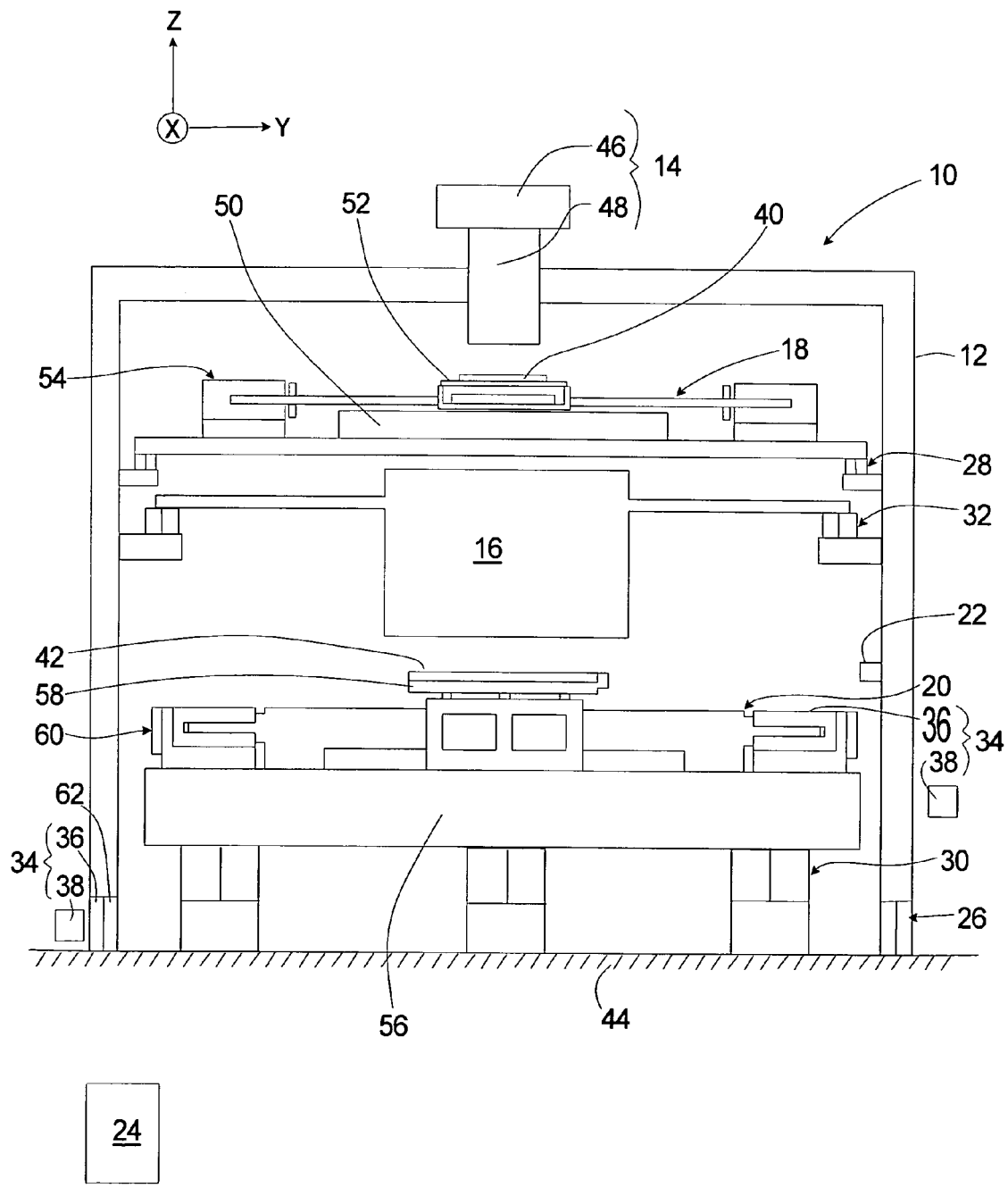
FIG. 1 is a schematic illustration of an exposure apparatus having features of the present invention.

FIG. 1 is a schematic illustration of a precision assembly, namely an exposure apparatus 10 having features of the present invention. The exposure apparatus 10 includes an apparatus frame 12, an illumination system 14 (irradiation apparatus), an optical assembly 16, a reticle stage assembly 18, a wafer stage assembly 20, a measurement system 22, a control system 24, a frame isolation system 26, a reticle stage isolation system 28, a wafer stage isolation system 30, and an optical assembly isolation system 32. The design of the components of the exposure apparatus 10 can be varied to suit the design requirements of the exposure apparatus 10.

As provided herein, one or both of the stage assemblies 18, 20 and/or one or more of the isolation systems 26, 28, 30, 32 can include a mover combination 34 having one or more movers 36 and one or more circulation systems 38 (illustrated as a box in FIG. 1). In one embodiment, the circulation system 38 reduces and/or controls the amount of heat transferred from the one or more movers 36 to the surrounding environment. With this design, the movers 36 can be placed closer to the measurement system 22 and/or the influence of the movers 36 on the accuracy of the measurement system 22 is reduced. Further, the exposure apparatus 10 is capable of manufacturing higher precision devices, such as higher density, semiconductor wafers.

A number of Figures include an orientation system that illustrates an X axis, a Y axis that is orthogonal to the X axis and a Z axis that is orthogonal to the X and Y axes. It should be noted that these axes can also be referred to as the first, second and third axes.

The exposure apparatus 10 is particularly useful as a lithographic device that transfers a pattern (not shown) of an integrated circuit from a reticle 40 onto a semiconductor wafer 42. The exposure apparatus 10 mounts to a mounting base 44, e.g., the ground, a base, or floor or some other supporting structure.

There are a number of different types of lithographic devices. For example, the exposure apparatus 10 can be used as a scanning type photolithography system that exposes the pattern from the reticle 40 onto the wafer 42 with the reticle 40 and the wafer 42 moving synchronously. In a scanning type lithographic device, the reticle 40 is moved perpendicularly to an optical axis of the optical assembly 16 by the reticle stage assembly 18 and the wafer 42 is moved perpendicularly to the optical axis of the optical assembly 16 by the wafer stage assembly 20. Scanning of the reticle 40 and the wafer 42 occurs while the reticle 40 and the wafer 42 are moving synchronously.

Alternatively, the exposure apparatus 10 can be a step-and-repeat type photolithography system that exposes the reticle 40 while the reticle 40 and the wafer 42 are stationary. In the step and repeat process, the wafer 42 is in a constant position relative to the reticle 40 and the optical assembly 16 during the exposure of an individual field. Subsequently, between consecutive exposure steps, the wafer 42 is consecutively moved with the wafer stage assembly 20 perpendicularly to the optical axis of the optical assembly 16 so that the next field of the wafer 42 is brought into position relative to the optical assembly 16 and the reticle 40 for exposure. Following this process, the images on the reticle 40 are sequentially exposed onto the fields of the wafer 42 and then the next field of the wafer 42 is brought into position relative to the optical assembly 16 and the reticle 40.

However, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern from a mask to a substrate with the mask located close to the substrate without the use of a lens assembly.

The apparatus frame 12 is rigid and supports the components of the exposure apparatus 10. The apparatus frame 12 illustrated in FIG. 1 supports the reticle stage assembly 18, the optical assembly 16 and the illumination system 14 above the mounting base 44.

The illumination system 14 includes an illumination source 46 and an illumination optical assembly 48. The illumination source 46 emits a beam (irradiation) of light energy. The illumination optical assembly 48 guides the beam of light energy from the illumination source 46 to the optical assembly 16. The beam illuminates selectively different portions of the reticle 40 and exposes the wafer 42. In FIG. 1, the illumination source 46 is illustrated as being supported above the reticle stage assembly 18. Typically, however, the illumination source 46 is secured to one of the sides of the apparatus frame 12 and the energy beam from the illumination source 46 is directed to above the reticle stage assembly 18 with the illumination optical assembly 48.

The illumination source 46 can be a g-line source (436 nm), an i-line source (365 nm), a KrF excimer laser (248 nm), an ArF excimer laser (193 nm) or a $F_2$ laser (157 nm). Alternatively, the illumination source 46 can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 40 to the wafer 42. Depending upon the design of the exposure apparatus 10, the optical assembly 16 can magnify or reduce the image illuminated on the reticle 40. The optical assembly 16 need not be limited to a reduction system. It could also be a 1× or magnification system.

When far ultra-violet rays such as the excimer laser is used, glass materials such as quartz and fluorite that transmit far ultra-violet rays can be used in the optical assembly 16. When the $F_2$ type laser or x-ray is used, the optical assembly 16 can be either catadioptric or refractive (a reticle should also preferably be a reflective type), and when an electron beam is used, electron optics can consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No. 8-171054 published in the Official Gazette for Laid-Open Patent Applications and its counterpart U.S. Pat. No. 5,668,672, as well as Japan Patent Application Disclosure No. 10-20195 and its counterpart U.S. Pat. No. 5,835,275. In these cases, the reflecting optical device can be a catadioptric optical system incorporating a beam splitter and concave mirror. Japan Patent Application Disclosure No. 8-334695 published in the Official Gazette for Laid-Open Patent Applications and its counterpart U.S. Pat. No. 5,689,377 as well as Japan Patent Application Disclosure No. 10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

The reticle stage assembly 18 holds and positions the reticle 40 relative to the optical assembly 16 and the wafer 42. The reticle stage assembly 18 can include a reticle stage base 50, a reticle stage 52 that retains the reticle 40, and a reticle stage mover assembly 54 that moves the reticle stage 52 relative to the wafer 42. In FIG. 1, the reticle stage mover assembly 54 utilizes one or more mover combinations 34 having features of the present invention. Depending upon the design, the reticle stage mover assembly 54 can also include additional actuators and motors that move the reticle stage 52.

Somewhat similarly, the wafer stage assembly 20 holds and positions the wafer 42 with respect to the projected image of the illuminated portions of the reticle 40 in the operational area. The wafer stage assembly 20 holds and positions the wafer 42 relative to the optical assembly 16. The wafer stage assembly 20 can include a wafer stage base 56, a wafer stage 58 that retains the wafer 42, and a wafer stage mover assembly 60 that moves the wafer stage 58. In FIG. 1, the wafer stage mover assembly 60 utilizes one or more mover combinations 34 having features of the present invention. Depending upon the design, the wafer stage mover assembly 60 can also include additional actuators and motors that move the wafer stage 58.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures in U.S. Pat. Nos. 5,623,853 and 5,528,118 are incorporated herein by reference.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically transferred to the floor (ground) by use of a frame member as described in U.S. Pat. No. 5,528,100 and published Japanese Patent Application Disclosure No. 8-136475. Additionally, reaction forces generated by the reticle (mask) stage motion can be mechanically transferred to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,100 and 5,874,820 and Japanese Patent Application Disclosure No. 8-330224 are incorporated herein by reference.

The measurement system 22 monitors movement of the reticle 40 and the wafer 42 relative to the optical assembly 16 or some other reference. With this information, the control system 24 can control the reticle stage assembly 18 to precisely position the reticle 40 and the wafer stage assembly 20 to precisely position the wafer 42. For example, the measurement system 22 can utilize multiple laser interferometers, encoders, and/or other measuring devices.

The control system is connected to the reticle stage assembly 18, the wafer stage assembly 20, the measurement system 22, the frame isolation system 26, the reticle stage isolation system 28, the wafer stage isolation system 30, and the optical assembly isolation system 32. The control system 24 receives information from the measurement system 22 and controls the stage mover assemblies 18, 20 to precisely position the reticle 40 and the wafer 42. Further, the control system 24 controls the circulation system(s) 38 to control the temperature of the mover(s) 36. The control system 24 includes one or more processors and circuits for performing the functions described herein.

In FIG. 1, (i) the frame isolation system 26 secures the apparatus frame 12 to the mounting base 44 and reduces the effect of vibration of the mounting base 44 causing vibration to the apparatus frame 12, (ii) the reticle stage isolation system 28 secures and supports the reticle stage assembly 18 to the apparatus frame 12 and reduces the effect of vibration of the apparatus frame 12 causing vibration to the reticle stage assembly 18, (iii) the wafer stage isolation system 30 secures and supports the wafer stage assembly 20 to the apparatus frame 12 and reduces the effect of vibration of the apparatus frame 12 causing vibration to the wafer stage assembly 20, and (iv) the optical stage isolation system 32 secures and supports the optical assembly 16 to the apparatus frame 12 and reduces the effect of vibration of the apparatus frame 12 causing vibration to the optical assembly 16. In this embodiment, each isolation system 26, 28, 30, 32 can include (i) one or more pneumatic cylinders 62 that isolate vibration, and (ii) one or more mover combinations 34 made pursuant to the present invention that isolate vibration and control the position of the respective apparatus.

A photolithography system (an exposure apparatus) according to the embodiments described herein can be built by assembling various subsystems, including each element listed in the appended claims, in such a manner that prescribed mechanical accuracy, electrical accuracy, and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, a total adjustment is performed to make sure that accuracy is maintained in the complete photolithography system. Additionally, it is desirable to manufacture an exposure system in a clean room where the temperature and cleanliness are controlled.

FIG. 2 is a perspective view of a first embodiment of a mover combination 234 having features of the present invention. For example, the mover combination 234 can be used in one of the stage assemblies 18, 20 (illustrated in FIG. 1), one or more of the isolation systems 26, 28, 30, 32 (illustrated in FIG. 1), and/or other components of the exposure apparatus 10 (illustrated in FIG. 1). Alternatively, the mover combination 234 can be used to move or position another type of device or object during a manufacturing, measurement and/or inspection process.

In FIG. 2, the mover combination 234 includes one mover 236 and one circulation system 238. Alternatively, for example, the mover combination 234 can include two or more movers 236 and/or two or more circulation systems 238. The design of each of these components can be varied to suit the requirement of the mover combination 234.

In this embodiment, the mover 236 is a linear motor and includes a magnet component 240, and a conductor component 242 that interacts with the magnet component 240. The design of these components can be varied. In FIG. 2, the conductor component 242 moves linearly along the X axis relative to the stationary magnet component 240. Alternatively, for example, the mover 236 could be designed so that the magnet component 240 moves relative to a stationary conductor component 242. Further, both the magnet component 240 and the conductor component 242 may not be stationary. It will be enough that at least one component is attached to a movable member like a stage or a table and movable relative to the other component. Still alternatively, the mover could be a voice coil motor and the conductor component could move along the Y axis relative to the magnet component.

In this embodiment, the magnet component 240 includes a magnet component housing 244 and one or more spaced apart magnet arrays 246. In FIG. 2, the magnet component housing 244 is somewhat rectangular "C" shaped and includes a generally rectangular shaped top wall, a generally rectangular shaped bottom wall and a generally rectangular rear wall that maintains the top wall spaced apart from and substantially parallel with the bottom wall. In one embodiment, the magnet component housing 244 is made of a magnetically permeable material, such as iron. The magnetically permeable material provides some shielding of the magnetic fields generated by the magnet array(s) 246, as well as providing a low reluctance magnetic flux return path for the magnetic fields of the magnet array(s) 246.

The number and design of magnet arrays 246 can be varied. For example, in FIG. 2, the magnet component 240 includes two spaced apart magnet arrays 246 that are spaced apart a magnet gap 248. One of the magnet arrays 246 is secured to the top wall and the other magnet array 246 is secured to the bottom wall. Alternatively, for example, the mover could be designed with a single magnet array 246.

Each of the magnet arrays 246 includes one or more magnets. For example, in FIG. 2, each magnet array 246 includes a plurality of rectangular shaped magnets that are aligned side-by-side and extend along the respective wall. The magnets in each magnet array 246 are orientated so that the poles alternate between the North pole and the South pole. Stated another way, the magnets in each magnet array 246 are arranged with alternating magnetic polarities. Further, the polarities of opposed magnets in the two magnet arrays 246 are opposite. This leads to strong magnetic fields in the magnet gap 248 and strong force generation of the mover 236. In one embodiment, each of the magnets is made of a high energy product, rare earth, permanent magnetic material such as NdFeB. Alternatively, for example, each magnet can be made of a low energy product, ceramic magnet or other type of material that generates a magnetic field.

The conductor component 242 moves along the axis in the magnet gap 248 between the magnet arrays 246. The control system 24 (illustrated in FIG. 1) directs and controls electrical current to the conductor component 242. The electrical current in the conductor component 242 interacts with the magnetic fields that surround the magnets in the magnet arrays 246. When electric current flows in the conductor component 242, a Lorentz type force is generated. This force can be used to move one of the components 242, 240 relative to the other component 240, 242.

The circulation system 238 directs a fluid 250 to the mover 236. With this design, in one embodiment, the circulation system 238 can be used to reduce and/or control the amount of heat transferred from the mover 236 to the environment that surrounds the mover 236. Stated another way, the circulation system 238 can be used to maintain the temperature of the mover 236. This reduces the influence of the mover 236 on the temperature of the environment surrounding the mover 236 and allows for more accurate positioning by the mover 236.

The design of the circulation system 238 can vary. In FIG. 2, the circulation system 238 directs the fluid 250 through the conductor component 242. Further, in FIG. 2, the circulation system 238 includes a reservoir 252 that retains the fluid 250, a fluid pump 254 in fluid communication with the reservoir 252, and a temperature adjuster 256 in fluid communication with the reservoir 252. The fluid pump 254 controls the flow rate and pressure of the fluid 250 that is directed to the mover 236. The temperature adjuster 256 adjusts and controls the temperature of the fluid 250 that is directed to the mover 236. The temperature adjuster 256 can be a heat exchanger, such as a chiller unit.

In one embodiment, the temperature, flow rate, and type of the fluid 250 is selected and controlled to control the temperature of the outer surface of the conductor component 242 and/or the mover 236. By controlling the temperature of the outer surface, the amount of heat transferred from the mover 236 to the surrounding environment can be controlled and optimized. In one embodiment, the fluid 250 is Flourinert type FC-77, made by 3M Company in Minneapolis, Minn.

Further, in one embodiment, the flow pressure of the fluid 250 is used to control the shape of at least a portion of the outer surface of the conductor component 242. As an example, the flow pressure can be controlled so that an outer surface of the conductor component 242 is deformed to be substantially planar shaped.

Figure 3A:
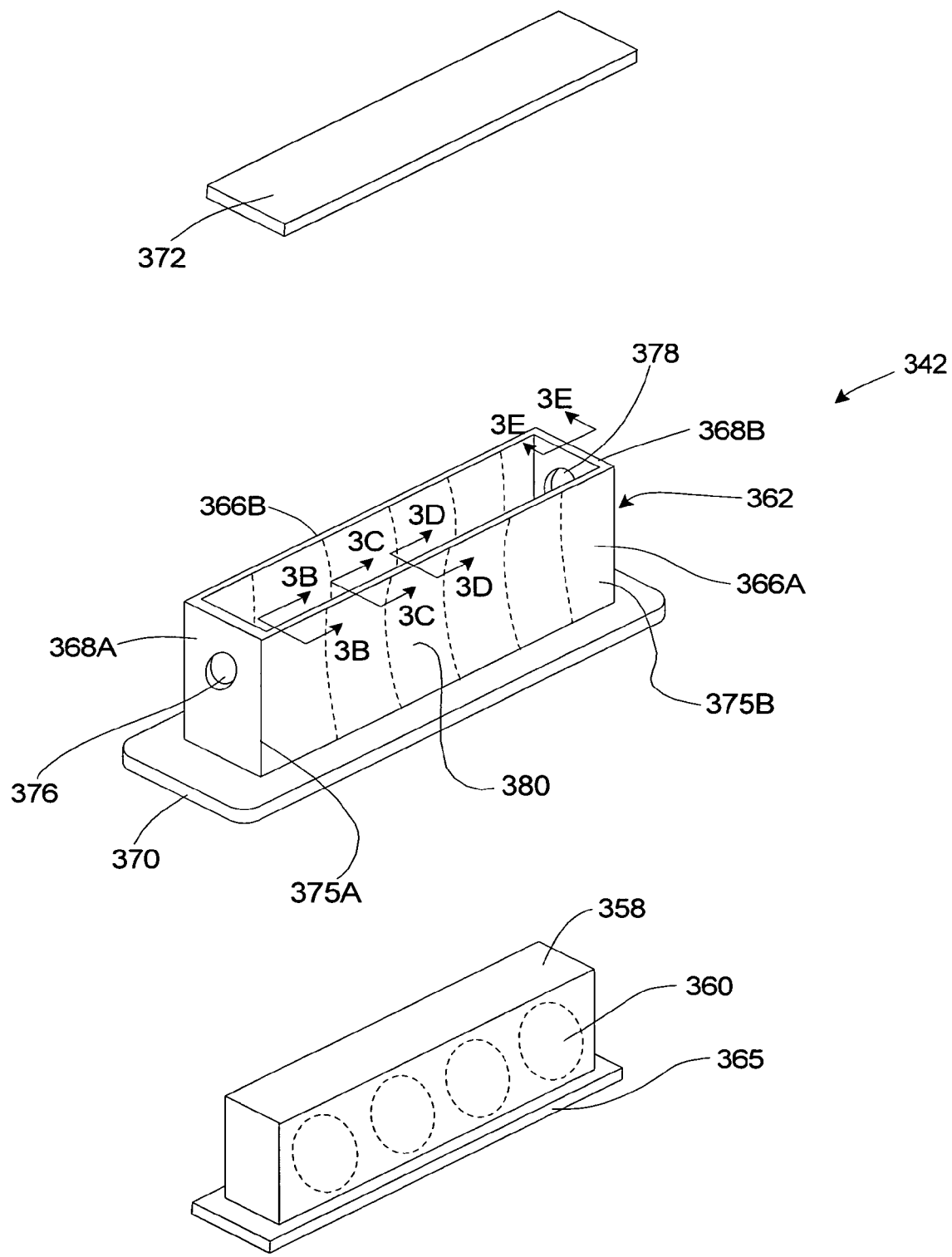
FIG. 3A is an exploded perspective view of a first embodiment of a conductor component having features of the present invention.

FIG. 3A is an exploded perspective view of one embodiment of a conductor component 342 that can be used in the mover combination 234 of FIG. 2. In this embodiment, the conductor component 342 includes one or more conductor array(s) 358 and a circulation housing 362. As an overview, in this embodiment, the circulation housing 362 is designed to cooperate with the conductor array 358 to define a fluid passageway 364 (illustrated in FIGS. 3H–3J and 3L–3N) near the conductor array 358. With this design, the circulation system 238 (illustrated in FIG. 2) can direct the fluid 250 (illustrated in FIG. 2) through the fluid passageway 364.

In FIG. 3A, the conductor component 342 includes a single conductor array 358 having a plurality of conductors 360 (illustrated in phantom) that are spaced apart linearly. In this embodiment, each conductor 360 is generally oval shaped and is made of metal such as copper or any substance or material responsive to electrical current and capable of creating a magnetic field. For example, each conductor 360 can be made of wire encapsulated in an epoxy. Alternatively, for example, the conductor component 342 could include a pair of spaced apart conductor arrays that are positioned on opposite sides of a single magnet array and/or the conductor array could include a single conductor.

In FIG. 3A, the conductor array 358 is generally rectangular shaped and fits within the circulation housing 362. Additionally, in FIG. 3A, the conductor array 358 includes a generally rectangular shaped conductor retainer 365 that is used to secure the conductor array 358 to the circulation housing 362. Alternatively, the conductor array 358 can be secured to the circulation housing 362 in another fashion.

The circulation housing 362 defines a cavity that receives the conductor array 358 and cooperates with the conductor array 358 to define the fluid passageway 364 that surrounds and/or encircles at least a portion of the conductor array 358. In FIG. 3A, the circulation housing 362 includes (i) a first side wall 366A, (ii) a second side wall 366B that is spaced apart and substantially parallel to the first side wall 366A, (iii) a front end wall 368A that extends between and is substantially perpendicular to the side walls 366A, 366B, (iv) a rear end wall 368A that is spaced apart and substantially parallel to the front wall 368B, and extends between and is substantially perpendicular to the side walls 366A, 366B, (v) a bottom, base wall 370 that is generally flat rectangular plate shaped, and (vi) a top, cap wall 372 that is generally flat rectangular plate shaped. The walls 366A, 366B, 368A, 368B cooperate to define a generally rectangular frame that is positioned over the base wall 370. The cap wall 372 fits across the tops of the walls 366A, 366B, 368A, 368B and the walls 366A, 366B, 368A, 368B are positioned over the base wall 370. In this embodiment, the base wall 370 includes an aperture 374 (illustrated in FIG. 3H) that receives the conductor array 358. Further, each wall 366A, 366B, 368A, 368B, 370, 372 includes a first end 375A and a second end 375B.

It should be noted that one or more of the walls 366A, 366B, 368A, 368B, 370, 372 are sometimes referred to as a first, second, third, fourth, fifth, and sixth walls. It should also be noted that the use of the terms top, bottom, front, rear, left, and right in the application is for convenience and these terms are merely for reference.

In one embodiment, at least one of the walls 366A, 366B, 368A, 368B, 370, 372 is made from a low or non-electrically conductive, non-magnetic material, such as low electrical conductivity titanium, or non-electrically conductive plastic, ceramics, or a carbon fiber reinforced plastic (CFRP). For example, in one embodiment each of the walls 366A, 366B, 368A, 368B, 370, 372 is made of a carbon fiber reinforced plastic.

In FIG. 3A, the walls 366A, 366B, 368A, 368B and the base 370 are molded, made and fabricated as a one piece, complete, continuous, integral unit. Further, the cap wall 372 can be secured to the walls 366A, 366B, 368A, 368B, so that the fluid 250 may be directed within the circulation housing 362. In one embodiment, an adhesive is used to secure the cap wall 372 to the walls 366A, 366B, 368A, 368B. Alternatively, for example, fasteners and a seal can be used to secure the cap wall 372 to the walls 366A, 366B, 368A, 368B.

Still alternatively, for example, one or more of the walls 366A, 366B, 368A, 368B can be made separate from the base wall 370 and can be subsequently secured to the base wall 370.

The circulation housing 362 includes one or more passageway inlet(s) 376 and one or more passageway outlet(s) 378. The location and number of passageway inlets 376 and passageway outlets 378 can be varied to influence the cooling of the conductor component 342. In FIG. 3A, a single passageway inlet 376 extends through the front end wall 368A and a single passageway outlet 378 extends through the rear end wall 368B. Alternatively, the passageway inlet 376 and/or the passageway outlet 378 can be located intermediate the end walls 368A, 368B. Still alternatively, for example, the single passageway inlet 376 and the single passageway outlet 378 illustrated in FIG. 3A can be replaced by multiple, spaced apart, inlets and/or multiple, spaced apart, outlets.

In one embodiment, at least one of the walls 366A, 366B, 368A, 368B, 370, 372 includes a curved region 380. In FIG. 3A, each curved region 380 is concave shaped with the curved region 380 facing the conductor array 358. With this design, each curved region 380 can be pushed out to be substantially flat and/or to take the approximate shape, under fluid flow pressure in the fluid passageway 364. Conversely, for example, if the pressure inside the passageway is less than atmospheric pressure, the wall would be designed to be convex and become planar during operation. This reduces the space and clearance requirements and allows for more space that can be occupied by conductors 360.

In the embodiment illustrated in FIG. 3A, each side wall 366A, 366B includes a curved region 380. Further, in this embodiment, the shape of the curvature varies with the distance from each end 375A, 375B of the side walls 366A, 366B in order to achieve the desired final shape. Further, the thickness of each wall 366A, 366B, 368A, 368B varies along the wall 366A, 366B, 368A, 368B.

As provided herein, the shape of the curved region 380 and the thickness of each wall 366A, 366B, 368A, 368B can be designed to provide the correct and desired stiffness and profile for deflection and stress of the circulation housing 362. In one embodiment, the curvature shape and/or thickness varies with distance from the end 375A, 375B in order to achieve the desired final shape.

Use of carbon fiber reinforced plastic allows variable wall thickness on the walls 366A, 366B, 368A, 368B, 370, 372. The non-magnetic CFRP eliminates the eddy current drag forces. The gain in space and eradication of eddy losses make a more efficient and cooler operating conductor component 342.

Figure 3B:
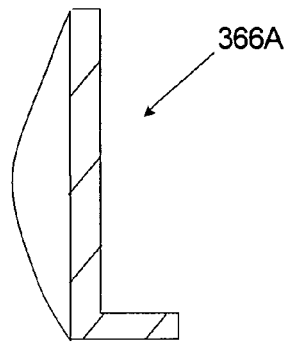
FIG. 3B is a cut-away view taken on line 3B—3B in FIG. 3A.
Figure 3C:
FIG. 3C is cut-away view taken on line 3C—3C in FIG. 3A.
Figure 3D:
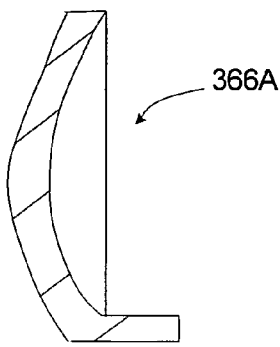
FIG. 3D is a cut-away view taken on line 3D—3D in FIG. 3A.

FIG. 3B is a cross-sectional view of the first side wall 366A at a first position taken near the first end 375A on line 3B—3B in FIG. 3A. FIG. 3C is a cross-sectional view of the first side wall 366A at a second position approximately ¼ of the way between the ends 375A, 375B taken on line 3C—3C in FIG. 3A. FIG. 3D is a cross-sectional view of the first side wall 366A at a third position approximately ½ between the ends 375A, 375B taken on line 3D—3D in FIG. 3A. Further, the cross-sectional view of the first side wall 366A at a position approximately ¼ of the way between the ends 375A, 375B as shown in FIG. 3C shows a cross-sectional view of the first side wall 366A at a position approximately ¾ of the way between the ends 375A, 375B. It should be noted that the use of the terms first position, second position, and third position is for convenience and the exact location of these positions can be varied.

As illustrated in these Figures, the cross-sectional shape and the curvature of the first side wall 366A is different at the three positions. Referring to FIGS. 3B–3D, (i) at the first position, the outer surface and the inner surface of the first side wall 366A is substantially planar shaped, (ii) at the second position, the outer surface and the inner surface are concave shaped, and (iii) at the third position the outer surface and the inner surface are concave shaped. The curve at the third position is greater than the curve at the second position. It should be noted, in this embodiment, that the shape of the curve varies according to the position along the first side wall 366A. Further, the shape of the curve can be proportional to the structural requirements of the first side wall 366A.

As provided herein, one or more of the other walls, including the second side wall 366B can have a similar or different profile than the first side wall 366A.

Further, as provided herein, one or more other characteristics of the first side wall 366A at the first position, the second position and/or the third position can be different. In one embodiment, the wall thickness at the first position is different than the wall thickness at the second position and/or the third position. In alternative embodiments, for example, the wall thickness at the first position can be at least approximately 0.2, 0.5, 1, 1.5, 2, 2.5, 3, 3.5, or 0.4 millimeters greater or less than the wall thickness at the second position, and/or the third position. Stated another way, the wall thickness at the first position can be at least approximately 5, 10, 25, 30, 50, 100, 150, 200, 250 or 300 percent greater or less than the wall thickness at the second position and/or the third position. With some of these designs, the thickness of the first side wall 366A is designed so that the first side wall 366A, including the outer surface, has the desired shape when the fluid 250 is directed into the conductor component 342.

It should be noted that the thickness of the wall can vary along the length and/or along the height of the first side wall 366A depending upon the desired final profile. For example, the thickness at the top of the first side wall 366A can be greater than the thickness at the bottom of the first side wall 366A.

Figure 3E:
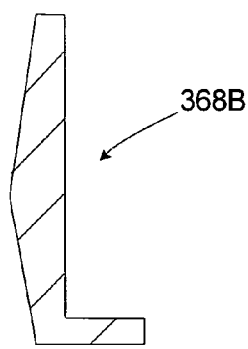
FIG. 3E is a cut-away view taken on line 3E—3E in FIG. 3A.

FIG. 3E is a cross-sectional view of one embodiment of the rear end wall 368B taken on line 3E—3E in FIG. 3A. FIG. 3E illustrates that the rear end wall 368B is widest intermediate the top and the bottom. In this embodiment, the inner surface is concave shaped and the outer surface is generally flat.

Figure 3F:
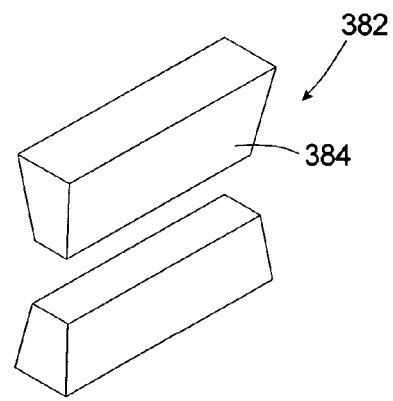
FIG. 3F is a perspective view of a mold assembly that can be used to fabricate at least a portion of the conductor component of FIG. 3A

FIG. 3F is a perspective view of a portion of a mold assembly 382 including a pair of cores 384 that can be used during the fabrication of a least a portion of the circulation housing 362. The walls of the circulation housing can be bowed out to remove the cores. Should the predicted deflection out or bow of the wall not provide enough draft angle for using removable cores 384 (e.g. patterns), the core 384 can also be made of wax, plastic or metal that does not melt at curing temperature but melts at a temperature higher than curing but low enough to not cause damage to the walls. Another process to remove the pattern is to dissolve the pattern with a fluid, such as water or a solvent.

Figure 3G:
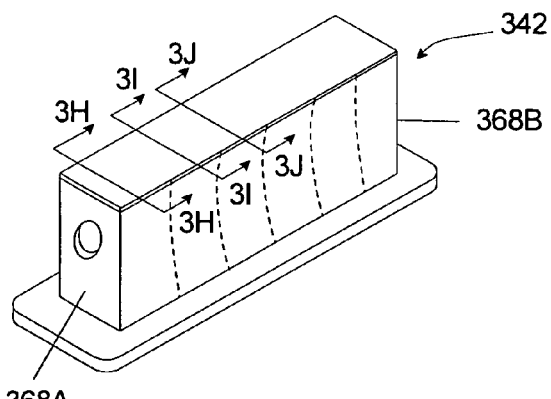
FIG. 3G is a perspective, assembled view of the conductor component of FIG. 3A.

FIG. 3G is a perspective view of the assembled conductor component 342. In this embodiment, the conductor component 342 is generally "T" shaped.

Figure 3H:
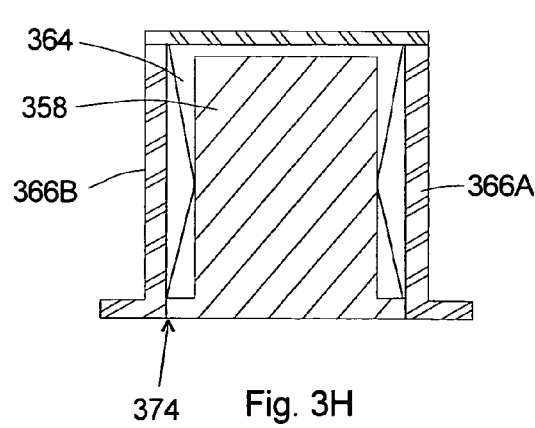
FIG. 3H is a cut-away view taken on line 3H—3H in FIG. 3G.

FIGS. 3H–3J each illustrate an alternate view of the shape of a portion of the fluid passageway 364 between the conductor array 358 and the side walls 366A, 366B at three alternate locations prior to directing the fluid 250 (illustrated in FIG. 2) through the fluid passageway 364. More specifically, FIG. 3H is taken at a first location near the front end wall 368A, FIG. 3I is taken at a second location approximately ¼ of the way between the end walls 368A, 368B and FIG. 3J is taken at a third location approximately ½ way between the end walls 368A, 368B. Stated another way, FIGS. 3H–3J illustrate the shape of the fluid passageway 364 between the conductor array 358 and the side walls 366A, 366B prior to directing fluid 250 through the fluid passageway 364 at three separate locations. In this embodiment, (i) the size of the fluid passageway 364 is greater at the first location than the second location and the third location and (ii) size of the fluid passageway 364 at the second location is greater than at the third location. Further, FIGS. 3H–3J illustrate that the side walls 366A, 366B are curved and arched towards the conductor array 358 prior to directing fluid 250 through the fluid passageway 364.

FIG. 3K is a perspective view of the conductor component 342 while fluid 250 (illustrated in FIG. 2) is directed into the conductor component 342. FIG. 3K illustrates that in this embodiment, that the outer surface of the first side wall 366A is deformed to be substantially flat and/or planar.

FIGS. 3L–3N illustrate the shape of a portion of the fluid passageway 364 between the conductor array 358 and the side walls 366A, 366B at three alternate locations while fluid 250 (illustrated in FIG. 2) is directed through the fluid passageway 364. More specifically, FIG. 3L is taken at a first location near the front end wall 368A, FIG. 3M is taken at a second location approximately ¼ of the way between the end walls 368A, 368B and FIG. 3N is taken at a third location approximately ½ way between the end walls 368A, 368B. Stated another way, FIGS. 3L–3N illustrate the shape of the fluid passageway 364 between the conductor array 358 and the side wall 366A, 366B while directing fluid 250 through the fluid passageway 364. FIG. 3L–3N illustrates that internal fluid pressure caused at least a portion of the walls 366A, 366B to deflect to a flat shape from the concave shape illustrated previously. While the fluid 250 is directed through the fluid passageway 364, the size of the fluid passageway 364 is approximately the same at the first location, the second location and the third location. Further, FIGS. 3L–3N illustrate that outer surface of each side wall 366A, 366B is substantially flat when fluid is directed through the fluid passageway 364.

The size of the fluid passageways 364 can vary. For example, the fluid passageway 364 can be defined by a gap of between approximately 0.5, 1, 1.5 millimeters between the circulation housing 362 and the conductor array 358.

FIG. 4 is a perspective view of another embodiment of a circulation housing 462 that can be used in the mover 236 of FIG. 2. In this embodiment, the circulation housing 462 is somewhat similar in shape and composition to the corresponding component described above. However, in this embodiment, a first side wall 466A, a second side wall 466B, a first end wall 468A, a second end wall 468B, a base wall 470, a top, cap wall 472 are molded as a one piece, complete, integral unit, making the entire circulation housing 462 one piece. This reduces the need for seals. Alternatively, for example, the base wall 470 can be made separately than the walls 466A, 466B, 468A, 468B, and the cap wall 472.

Figure 5:
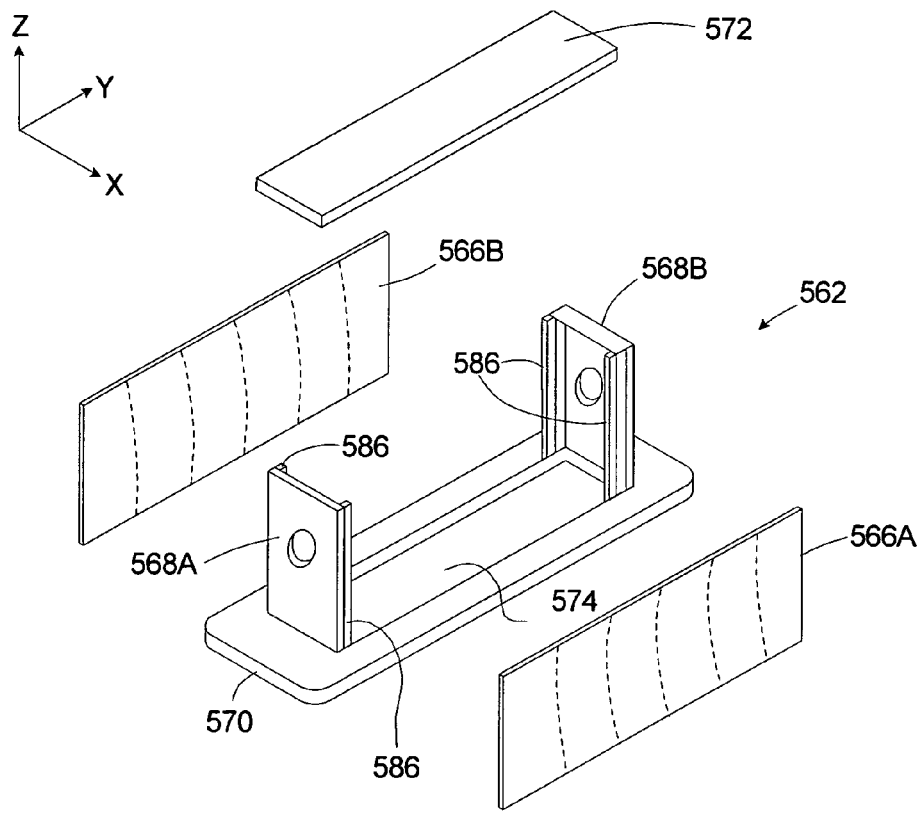
FIG. 5 is an exploded perspective view of still another embodiment of a circulation housing having features of the present invention.

FIG. 5 is an exploded perspective view of yet another embodiment of a circulation housing 562 that can be used in the mover 236 of FIG. 2. In this embodiment, the circulation housing 562 is somewhat similar in shape and composition to the corresponding component described above. However, in this embodiment, each of the first and the second walls 566A, 566B and the cap wall 572 are made separately than the first and the second end walls 568A, 568B and the base wall 570. In this embodiment, the side walls 566A, 566B and the cap wall 572 are secured and sealed to the end walls 568A, 568B and the base wall 570. Stated another way, in this embodiment, the base wall 570 and the end walls 568A, 568B are made as a single unit. Further, the side walls 566A, 566B and the cap wall 572 each are made individually. In this embodiment, the base wall 570 is generally rectangular plate shaped and includes a base aperture 574 for receiving a portion of the conductor array 358 (illustrated in FIG. 3A) and retaining the conductor array 358. The end walls 568A, 568B are each generally flat plate shaped and include a pair of spaced apart lips 586 that extend inward towards the other end wall 568A, 568B. The lips 586 are used to secure the side walls 566A, 566B to the end walls 568A, 568B.

Figure 6:
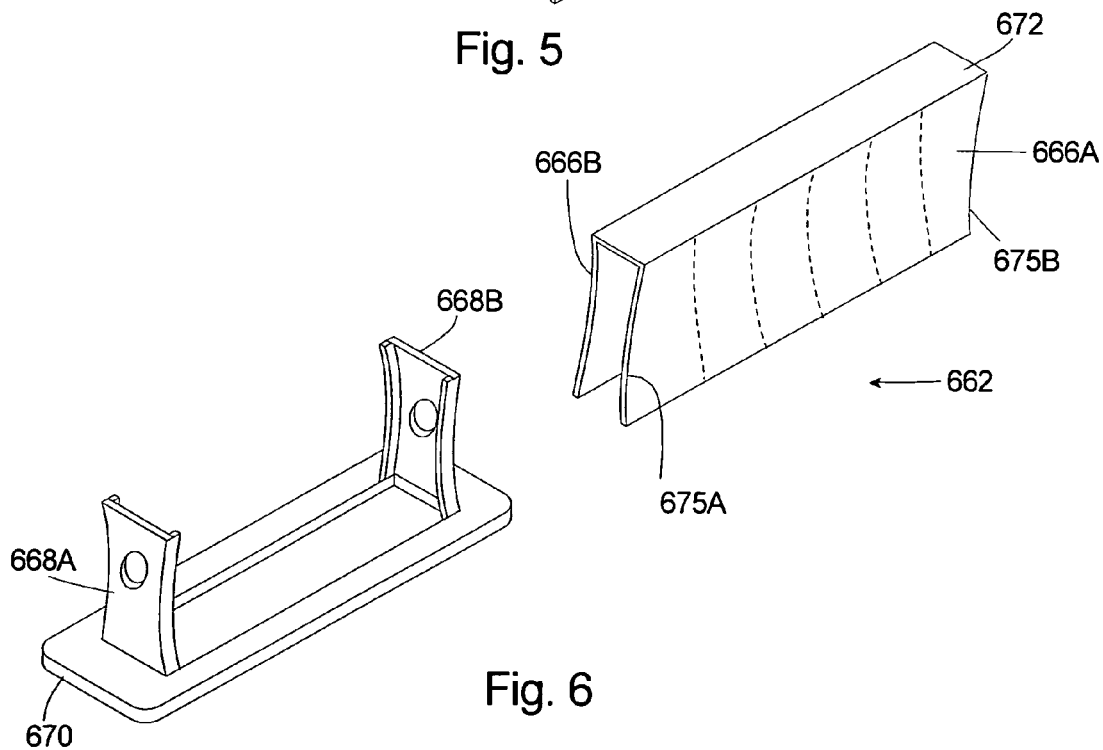
FIG. 6 is an exploded perspective view of yet another embodiment of a circulation housing having features of the present invention.

FIG. 6 is an exploded perspective view of still another embodiment of a circulation housing 662 that can be used in the mover 236 of FIG. 2. In this embodiment, the circulation housing 662 is somewhat similar in shape and composition to the corresponding component described above. However, in this embodiment, the first and the second walls 666A, 666B and the cap wall 672 are made separately than the first and the second end walls 668A, 668B and the base wall 670. Stated another way, the side walls 666A, 666B and the cap wall 672 are made as an integral unit and the end walls 668A, 668B and the base wall 670 are made as an integral unit. In this embodiment, the side walls 666A, 666B and the cap wall 672 are secured and sealed to the end walls 668A, 668B and the base wall 670.

Additionally, in this embodiment, the side walls 666A, 666B are curved near the first and the second end 675A, 675B.

Figure 7A:
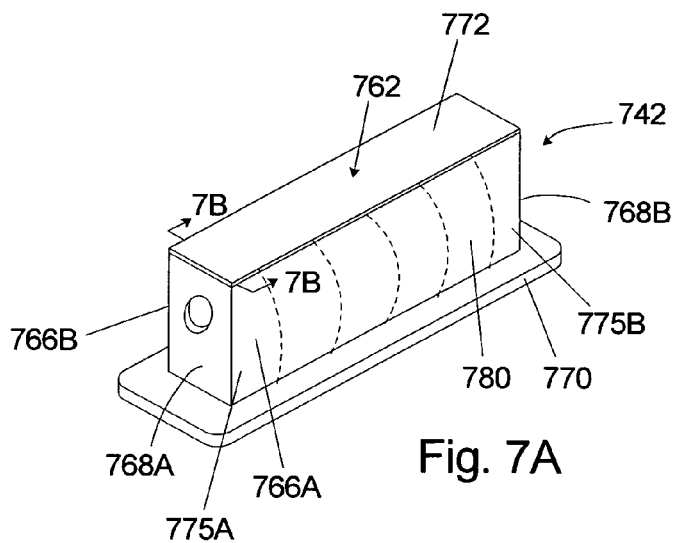
FIG. 7A is a perspective, assembled view of another embodiment of a conductor component having features of the present invention.

FIG. 7A is a perspective view of another embodiment of a conductor component 742 that can be used in the mover 236 of FIG. 2. In this embodiment, the conductor component 742 includes a circulation housing 762 having (i) a first side wall 766A, (ii) a second side wall 766B, (iii) a front end wall 768A, (iv) a rear end wall 768B, (v) a bottom, base wall 770, and (vi) a top, cap wall 772 that are somewhat similar to the corresponding components described above. The circulation housing 762 can be made in a similar fashion and using similar materials as the embodiments described above.

However, in this embodiment, at least one of the walls 766A, 766B, 768A, 768B, 770, 772 includes a convex, curved region 780. As provided herein, the shape of the curved region 780 and the thickness of each wall 766A, 766B, 768A, 768B can be designed to provide the correct and desired stiffness and profile for deflection and stress of the circulation housing 762. In one embodiment, the curvature shape and/or thickness varies with distance from the end 775A, 775B in order to achieve the desired final shape.

Figure 7B:
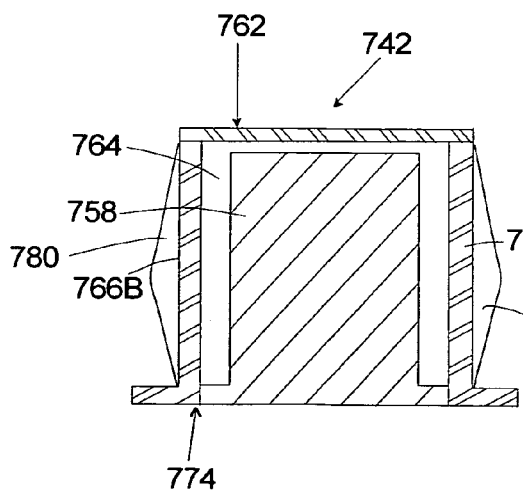
FIG. 7B is a cut-away view taken on line 7B—7B in FIG. 7A.

FIG. 7B illustrates a cross-sectional view of the conductor component 742 of FIG. 7A at one position, including the conductor array 758 and the circulation housing 762. In this embodiment, the circulation housing 762 cooperates with the conductor array 758 to define a fluid passageway 764 near the conductor array 758.

In FIG. 7B, each side wall 766A, 766B includes a curved region 780 that is convex shaped with the curved region 780 facing away from the conductor array 758. It should be noted, in this embodiment, that the shape of the curve varies according to the position along the side wall 766A, 766B. With this design, each curved region 780 can be pushed in to be substantially flat and/or to take the approximate shape under fluid flow pressure.

In this embodiment, the circulation system 238 (illustrated in FIG. 2) directs a fluid 250 (illustrated in FIG. 2) into the circulation housing 762. In one embodiment, the flow pressure of the fluid 250 is used to control the shape of at least a portion of the outer surface of the conductor component 742. As an example, the flow pressure can be controlled so that an outer surface of the conductor component 742 is deformed to be substantially planar shaped. For example, if the pressure inside the passageway 764 is less than atmospheric pressure, the convex side walls 766A, 766B would become planar during operation. This reduces the space and clearance requirements and allows for more space that can be occupied by conductor array 758.

As provided herein, one or more of the other walls, can have a similar or different profile than the first side wall 766A. It should be noted that the thickness of the each wall can vary along the length and/or along the height of the respective wall depending upon the desired final profile.

Figure 8A:
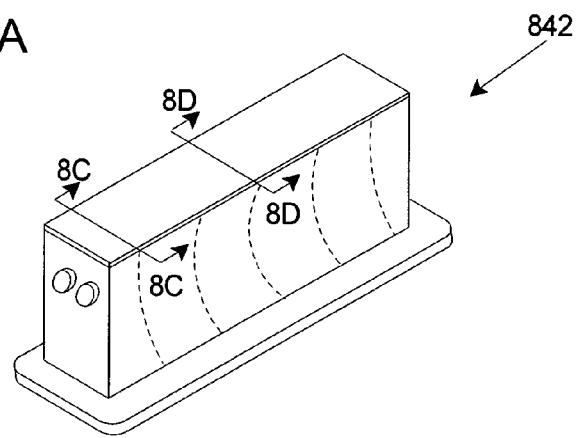
FIG. 8A is a perspective, assembled view of yet another embodiment of a conductor component having features of the present invention.

FIG. 8A is a perspective view of another embodiment of a conductor component 842 that can be used in the mover 236 of FIG. 2. In this embodiment, the conductor component 842 is somewhat similar to the corresponding component described above.

Figure 8C:
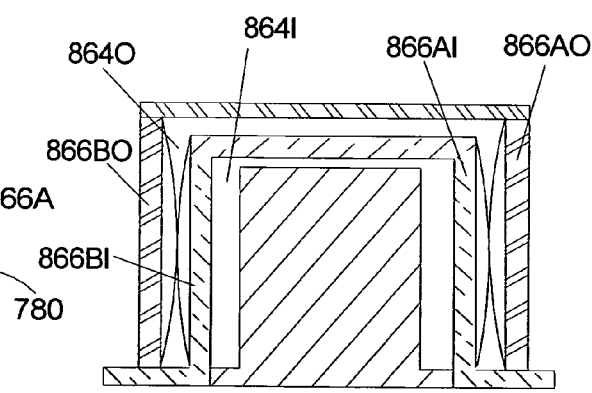
FIG. 8C is a cut-away view taken on line 8C—8C in FIG. 8A.
Figure 8B:
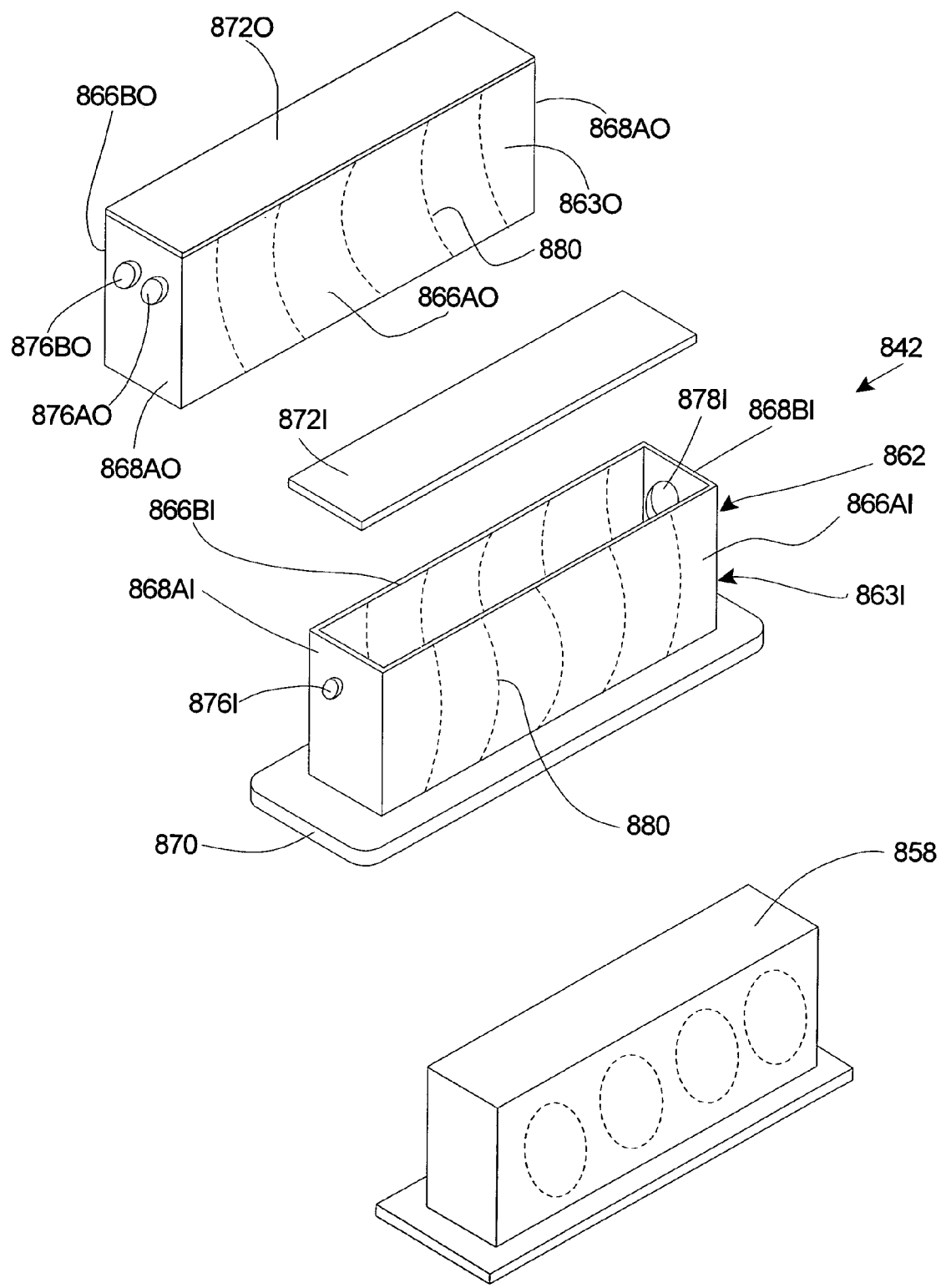
FIG. 8B is an exploded perspective view of the conductor component of FIG. 8A.

FIG. 8B is an exploded perspective view of the conductor component 842 of FIG. 8A including the conductor array 858 and the circulation housing 862. In this embodiment, the conductor array 858 is somewhat similar to the corresponding component described above. However, in this embodiment, the circulation housing 862 is designed to cooperate with the conductor array 858 to define an inner fluid passageway 864I (illustrated in FIGS. 8C–8E) and an outer fluid passageway 864O (illustrated in FIGS. 8C–8E). With this design, the circulation system 238 (illustrated in FIG. 2) can direct the fluid 250 (illustrated in FIG. 2) through the fluid passageways 864I, 864O. Further, the outer fluid passageway 864O completely encircles the conductor array 858 and the inner passageway 864I.

In FIG. 8B, the circulation housing 862 includes an inner housing 863I and an outer housing 863O that encircles the inner housing 863I. In this embodiment, the inner housing 863I includes (i) a first side inner wall 866AI, (ii) a second side inner wall 866BI that is spaced apart and substantially parallel to the first side inner wall 866AI, (iii) a front end inner wall 868AI that extends between and is substantially perpendicular to the side inner walls 866AI, 866BI, (iv) a rear end inner wall 868BI that is spaced apart and substantially parallel to the front inner wall 868BI, and extends between and is substantially perpendicular to the side inner walls 866AI, 866BI, and (v) a top, inner cap wall 872I that is generally flat rectangular plate shaped. The walls 866AI, 866BI, 868AI, 868BI cooperate to define a generally rectangular frame that is positioned over a base wall 870.

Somewhat similarly, the outer housing 863O includes (i) a first side outer wall 866AO, (ii) a second side outer wall 866BO that is spaced apart and substantially parallel to the first side outer wall 866AO, (iii) a front end outer wall 868AO that extends between and is substantially perpendicular to the side outer walls 866AO, 866BO, (iv) a rear end outer wall 868BO that is spaced apart and substantially parallel to the front end outer wall 868BO, and extends between and is substantially perpendicular to the side outer walls 866AO, 866BO, and (v) a top, outer cap wall 872O that is generally flat rectangular plate shaped. The walls 866AO, 866BO, 868AO, 868BO cooperate to define a generally rectangular frame that is positioned over the base wall 870.

In this embodiment, the walls 866AI, 866BI, 868AI, 868BI, 866AO, 866BO, 868AO, 868BO can be somewhat similar in design as the corresponding components described above. More specifically, at least one of the walls 866AI, 866BI, 868AI, 868BI, 866AO, 866BO, 868AO, 868BO can include a curved region 880. In FIG. 8B, each curved region 880 of the side outer walls 866AO, 866BO is concave shaped with the curved region 880 facing the conductor array 858 and each curved region 880 of the side inner walls 866AI, 866BI is convex shaped with the curved region 880 facing away form the conductor array 858. With this design, each curved region 880 of the side outer walls 866AO, 866BO can be pushed out to be substantially flat and/or to take the approximate shape, under fluid flow pressure in the outer fluid passageway 864O and each curved region 880 of the side inner walls 866AI, 866BI can be pushed inward if the pressure inside the inner fluid passageway 864I is less than the pressure inside the outer fluid passageway 864O.

It should be noted that the side inner walls 866AI, 866BI can be substantially parallel to the side outer walls 866AO, 866BO. Further, the side inner walls 866AI, 866BI can be a different shape and/or thickness than the side outer walls 866AO, 866BO.

Figure 8D:
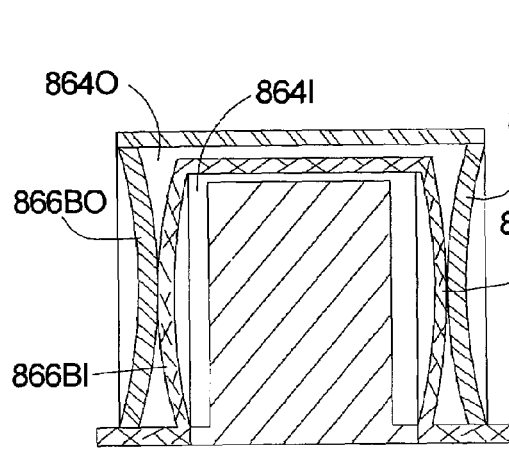
FIG. 8D is a cut-away view taken on line 8D—8D in FIG. 8A.

FIGS. 8C and 8D each illustrate an alternate view of the shape of a portion of the fluid passageways 864I, 864O and the side walls 866AI, 866AO, 866BI, 866BO at two alternate locations prior to directing the fluid 250 (illustrated in FIG. 2) through the fluid passageways 864I, 864O.

Figure 8E:
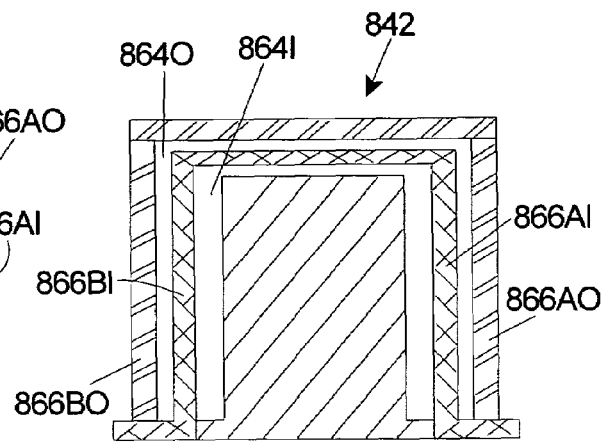
FIG. 8E is a cut-away view of the conductor component of FIG. 8A when fluid is directed to the conductor component.

FIG. 8E illustrates the shape of a portion of the fluid passageways 864I, 864O and the side walls 866AI, 866AO, 866BI, 866BO while fluid 250 (illustrated in FIG. 2) is directed through the fluid passageways 864I, 864O. FIG. 8E illustrates that internal fluid pressure caused at least a portion of the side walls 866AO, 866BO, 866AI, 866BI to deflect to a flat shape.

In one embodiment, the circulation system directs the fluid 250 to the outer passageway 864O. Subsequently, the fluid 250 is transferred from the outer passageway 864O to the inner passageway 864I. Further, the fluid 250 is transferred from the inner passageway 864I back to the circulation system. With this design, the relatively cool fluid 250 that enters the outer passageway 864O insulates the conductor component 842. Further, with this design, the fluid 250 in the outer fluid passageway 864O is at a slightly greater pressure than the pressure in the inner fluid passageway 864I. With this design, the side inner walls 866AI, 866BI can initially be slightly convex.

In another embodiment, the circulation system can direct a first fluid (not shown) into the outer passageway 864O and a second fluid (not shown) into the inner passageway 864I. In this case, the outer housing includes a first outer inlet 876AO and a second outer inlet 876BO. The first outer inlet 876AO is connected to the outer fluid passageway 864O to flow the first fluid into the passageway 864AO. The second outer inlet 876BO is connected to an inner inlet 876I that is connected to the inner fluid passageway 864I to flow the second fluid into the inner fluid passageway 864I. Similarly, the outer housing includes a first outer outlet (not shown) and a second outer outlet (not shown) that are connected to the circulation system as shown in FIG. 2. Also, the inner housing includes an inner outlet 878I that is connected to the second outer outlet to return the second fluid from the inner fluid passageway 864I to the circulation system. The fluids can be at different temperatures and pressures to achieve the desired cooling of the conductor component 842 and/or reduce the amount of heat transferred from the conductor component 842 to the surrounding environment. The composition of the fluids can be the same or different. Further, the side walls 866AI, 866AO, 866BI, 866BO can be appropriately shaped to achieve the desired profile.

Figure 9A:
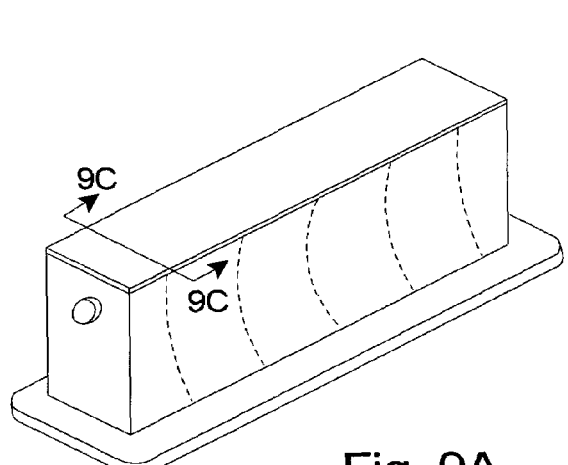
FIG. 9A is a perspective, assembled view of yet another embodiment of a conductor component having features of the present invention.

FIG. 9A is a perspective view of another embodiment of a conductor component 942 that can be used in the mover 236 of FIG. 2. In this embodiment, the conductor component 942 is somewhat similar to the corresponding component described above.

Figure 9C:
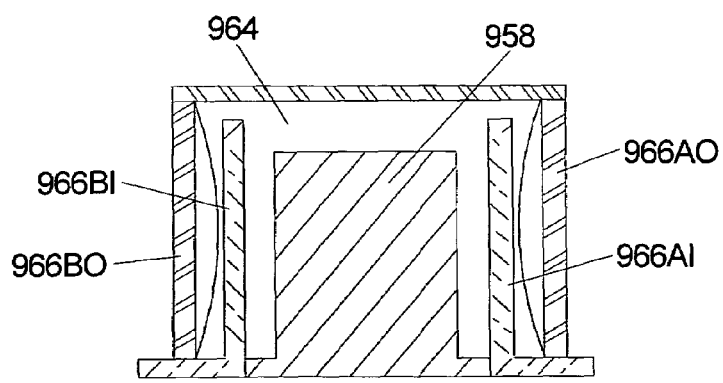
FIG. 9C is a cut-away view taken on line 9C—9C in FIG. 9A.
Figure 9B:
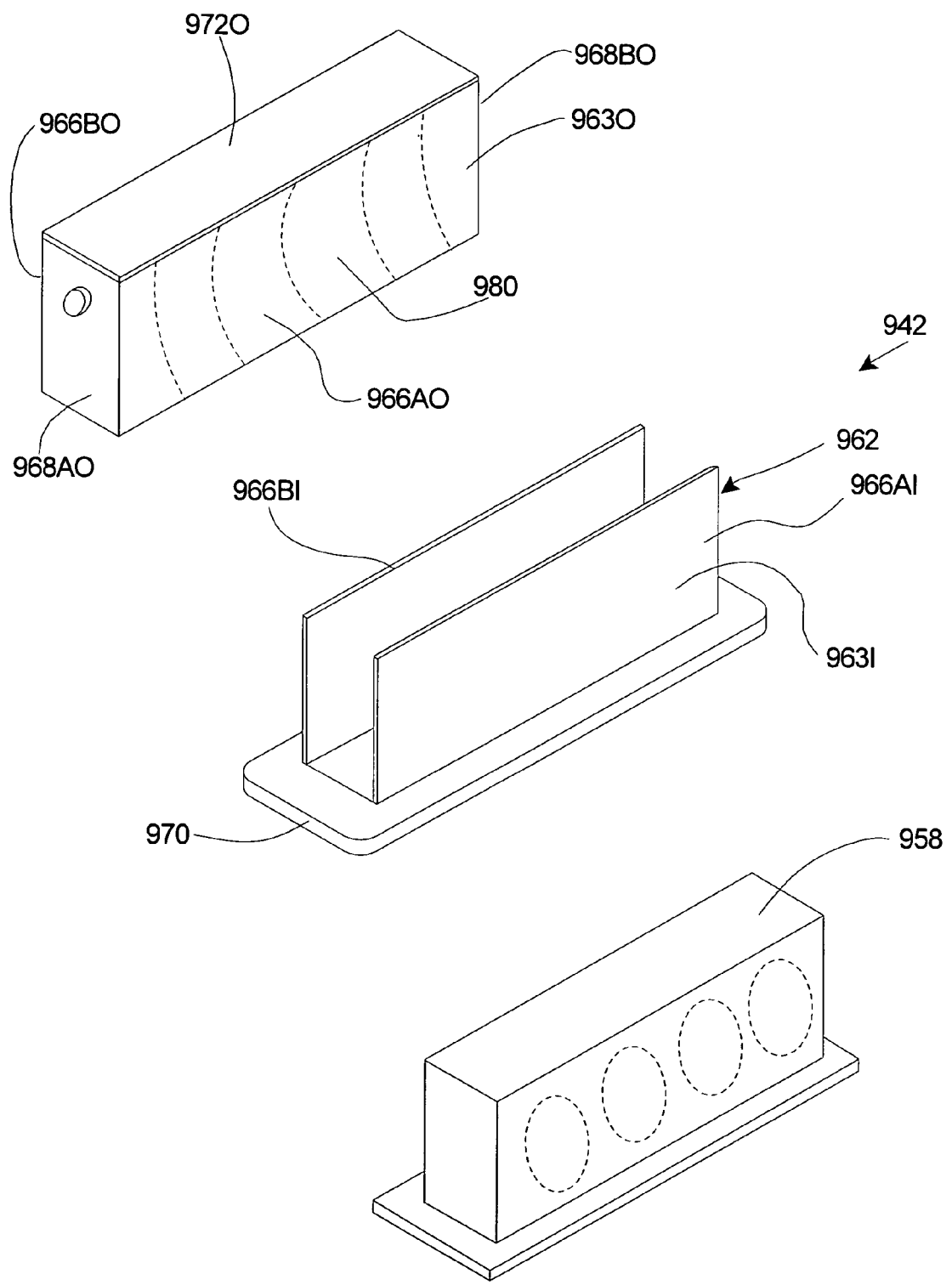
FIG. 9B is an exploded perspective view of the conductor component of FIG. 9A.

FIG. 9B is an exploded perspective view of the conductor component 942 of FIG. 9A including the conductor array 958 and the circulation housing 962. In this embodiment, the conductor array 958 is somewhat similar to the corresponding component described above. In this embodiment, the circulation housing 962 is designed to cooperate with the conductor array 958 to define a fluid passageway 964 (illustrated in FIG. 9C) near the conductor array 958. With this design, the circulation system 238 (illustrated in FIG. 2) can direct the fluid 250 (illustrated in FIG. 2) through the fluid passageway 964.

In FIG. 9B, the circulation housing 962 includes an inner housing 963I and an outer housing 963O. The inner housing 963I includes (i) a first side inner wall 966AI, and (ii) a second side inner wall 966BI that is spaced apart and substantially parallel to the first side inner wall 966AI. The walls 966AI, 966BI extend away from a base wall 970.

The outer housing 963O includes (i) a first side outer wall 966AO, (ii) a second side outer wall 966BO that is spaced apart and substantially parallel to the first side outer wall 966AO, (iii) a front end outer wall 968AO that extends between and is substantially perpendicular to the side outer walls 966AO, 966BO, (iv) a rear end outer wall 968BO that is spaced apart and substantially parallel to the front outer wall 968BO, and extends between and is substantially perpendicular to the side outer walls 966AO, 966BO, and (v) a top, outer cap wall 972O that is generally flat rectangular plate shaped. The walls 966AO, 966BO, 968AO, 968BO cooperate to define a generally rectangular frame that is positioned over the base wall 970.

In this embodiment, the walls 966AI, 966BI, 966AO, 966BO, 968AO, 968BO can be similar in design as the corresponding components described above. More specifically, at least one of the walls 966AI, 966BI, 966AO, 966BO, 968AO, 968BO includes a curved region 980. In FIG. 9B, each outer side wall 966AO, 966BO includes a curved region 980 that is concave shaped with the curved region 980 facing the conductor array 958. With this design, each curved region 980 can be pushed out to be substantially flat and/or to take the approximate shape, under fluid flow pressure in the fluid passageway 964. Conversely, if the pressure inside the passageway is less than atmospheric pressure, the wall would be convex and become planar during operation. This reduces the space and clearance requirements and allows for more space that can be occupied by conductors 960.

FIG. 9C illustrates the shape of a portion of the fluid passageway 964 and the side walls 966AI, 966AO, 966BI, 966BO prior to directing the fluid 250 (illustrated in FIG. 2) through the fluid passageway 964. FIG. 9C illustrates that the side walls 966BI, 966BO are curved and arched towards the conductor array 958 prior to directing fluid 250 through the fluid passageway 964.

As provided herein, the shape of the curved region 980 and the thickness of each wall 966BI, 966BO can be designed to provide the correct and desired stiffness and profile for deflection and stress of the circulation housing 962.

Figure 9D:
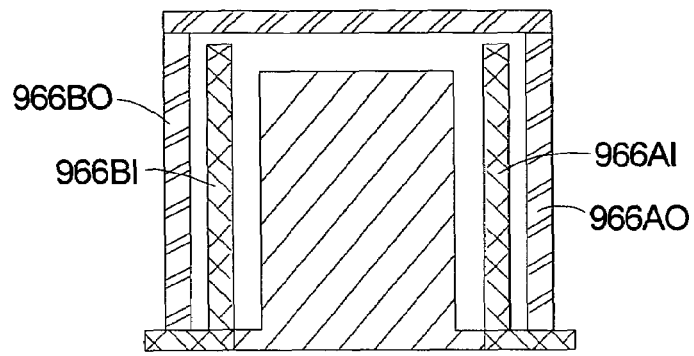
FIG. 9D is a cut-away view taken on line 9D—9D in FIG. 9A.

FIG. 9D illustrates the shape of a portion of the fluid passageway 964 and the side walls 966AI, 966AO, 966BI, 966BO while fluid 250 (illustrated in FIG. 2) is directed through the fluid passageway 964. FIG. 9D illustrates that internal fluid pressure caused at least a portion of the outer walls 966AO, 966O to deflect to a flat shape from the concave shape illustrated previously.

Figure 10A:
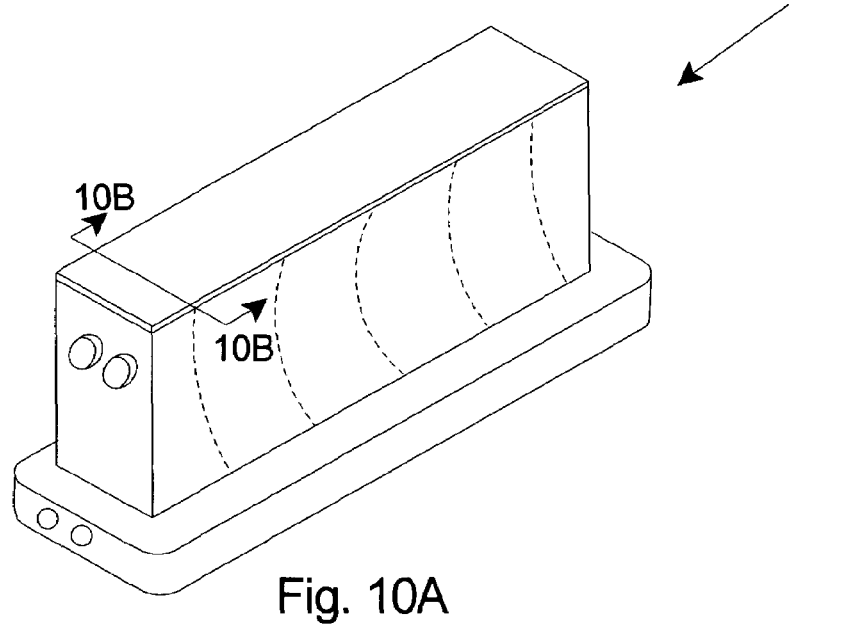
FIG. 10A is a perspective, assembled view of yet another embodiment of a conductor component having features of the present invention.

FIG. 10A is a perspective view of another embodiment of a conductor component 1042 that can be used in the mover 236 of FIG. 2. In this embodiment, the conductor component 1042 is somewhat similar to the corresponding component described above.

Figure 10B:
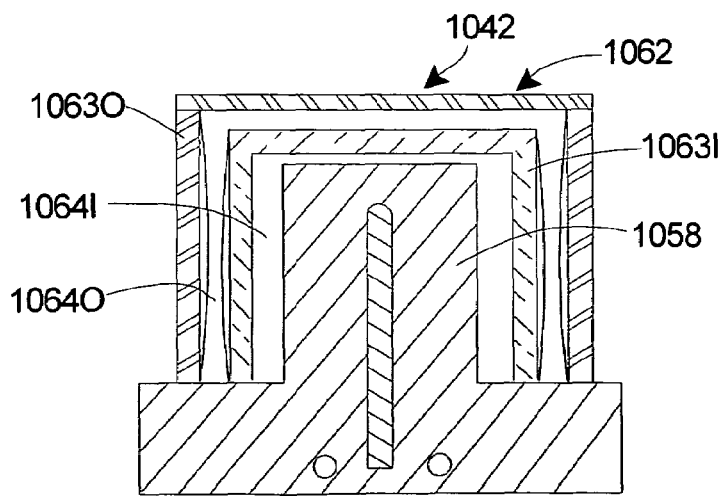
FIG. 10B is a cut-away view taken on line 10B—10B in FIG. 10A.

Referring to FIG. 10B, in this embodiment, the circulation housing 1062 is designed to cooperate with the conductor array 1058 to define an inner fluid passageway 1064I and an outer fluid passageway 1064O. More specifically, FIG. 10B illustrates the shape of a portion of the fluid passageways 1064I, 1064O prior to directing the fluid 250 (illustrated in FIG. 2) through the fluid passageways 1064I, 1064O. In FIG. 8B, the circulation housing 1062 includes an inner housing 1063I and an outer housing 1063O that are somewhat similar to the corresponding components described above.

In one embodiment, the circulation system directs the fluid 250 to the outer passageway 1064O. Subsequently, the fluid 250 is transferred from the outer passageway 1064O to the inner passageway 1064I. Further, the fluid 250 is transferred from the inner passageway 1064I back to the circulation system. Further, in one embodiment, the flow pressure of the fluid 250 is used to control the shape of at least a portion of the outer surface of the conductor component 1042.

Figure 10C:
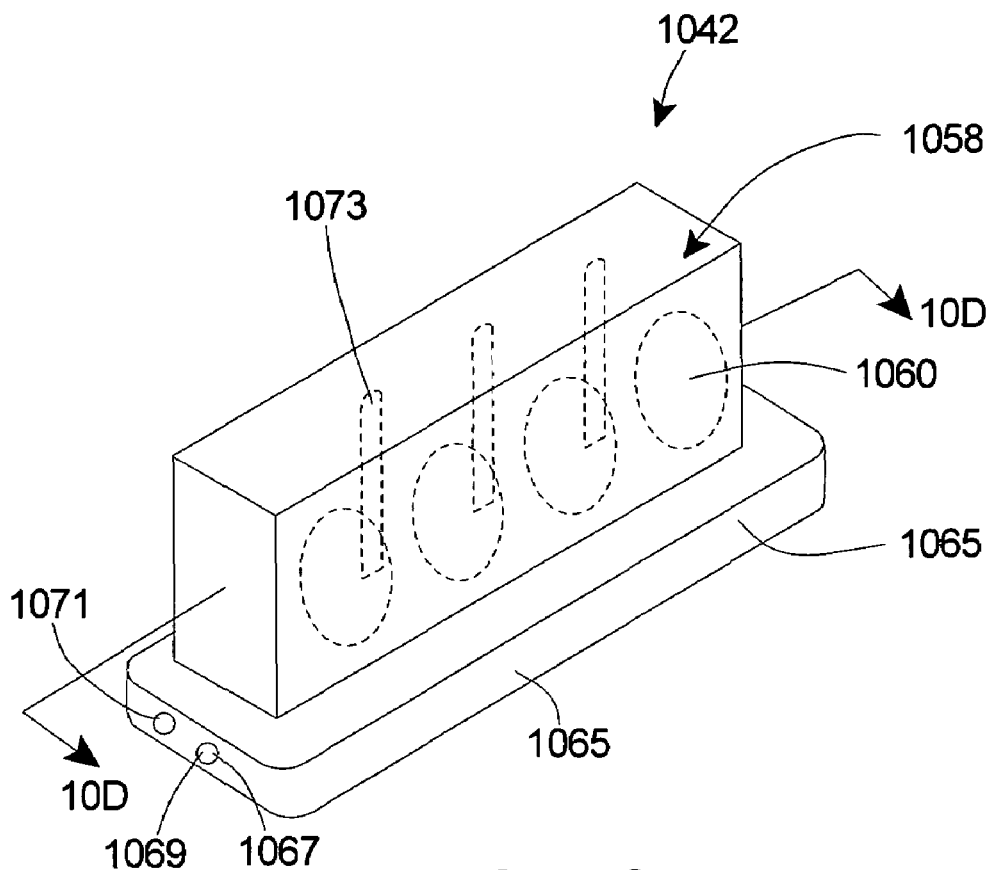
FIG. 10C is an exploded perspective view of the conductor array of FIG. 10A.

FIG. 10C is an exploded perspective view of the conductor array 1058 of FIG. 10A. In this embodiment, the conductor array 1058 is somewhat similar to the corresponding component described above. However, in this embodiment, instead of the base wall described in the above, the conductor retainer 1065 includes a sealed retainer passageway 1067 having at least one inlet 1069 and at least one outlet 1071. Additionally, the conductor array 1058 includes one or more heat transferers 1073 (illustrated in phantom) that transfer heat from the conductor array 1058. In one embodiment, the heat transferers 1073 transfer heat from the conductor array 1058 to the retainer passageway 1067. Alternatively, for example, the heat transferers 1073 can transfer the heat from the conductor array 1058 to another location. For example, the heat transferers 1073 can transfer heat from the conductor arrays 1058 to the outside of the conductor component 1042.

Figure 10D:
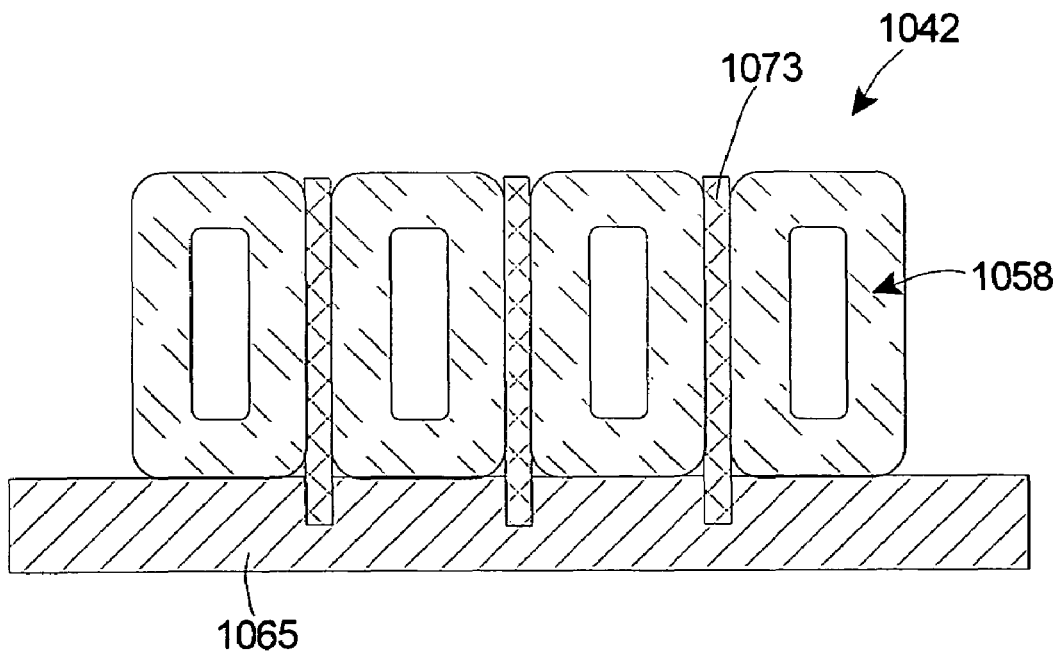
FIG. 10D is a cut-away view taken on line 10D—10D in FIG. 10C.

The number and position of the heat transferers 1073 can vary. For example, in FIGS. 10C and 10D, the conductor component 1042 includes three spaced apart heat transferers 1073. Alternatively, the conductor component 1042 can include more than three or less than three heat transferers.

In this embodiment, the circulation system 238 (illustrated in FIG. 2) is modified to deliver another fluid (not shown) to the inlet 1069 to circulate the fluid through the retainer passageway 1067.

The design of the heat transferers 1073 can vary. In the embodiment illustrated in FIGS. 10C and 10D, each heat transferer 1073 includes a first end that is positioned within the conductor array 1058 and a second end positioned near the retainer passageway 1067. With this design, each heat transferer 1073 can be used to transfer heat from the conductor array 1058 to the retainer passageway 1067. Alternatively, the second end could be exposed, directly positioned within the retainer passageway 1067 or in thermal communication with an external chiller. In one embodiment, one or more of the heat transferers 1073 is in direct thermal contact with the conductors. In another embodiment, one or more of the heat transferers 1073 is substantially not in electrical contact with and is electrically isolated from the conductors.

In one embodiment, at least one of the heat transferers 1073 is a heat pipe. In this embodiment, the heat pipe consists of a sealed metal tube containing a liquid and a wick. With this design, the liquid evaporates at the heated first end and the vapor spreads along the tube to the cold second end, where it condenses onto the wick, the liquid flows back along the wick to the hot first end by capillary action. The type of liquid and pressure in the tube can be varied to suit the design requirement of the heat pipe.

In another embodiment, the heat transferers 1073 can be a solid beam or structure that is formed from a suitable material that has a relatively high thermal conductivity. For example, in alternative embodiments, the material in the heat transferer can have a thermal conductivity of at least approximately 50 watts per meter degree Kelvin (W/mK), 100 W/mK, 200 W/mK, or 300 W/mK. Examples of materials that satisfy these desired thermal conductivity ranges, along with their approximate thermal conductivity values, include aluminum (237 W/mK), gold (317 W/mK), copper (401 W/mK) and silver (429 W/mK). Alternately, other suitable materials having thermal conductivities in the ranges provided herein can be used.

In one embodiment, the heat transferers 1073 remove the majority of the heat generated in the conductors and the fluid that is circulated in the outer fluid passageway 1064O maintains the outer surface of the conductor component 1042 at the desired temperature.

Figure 11A:
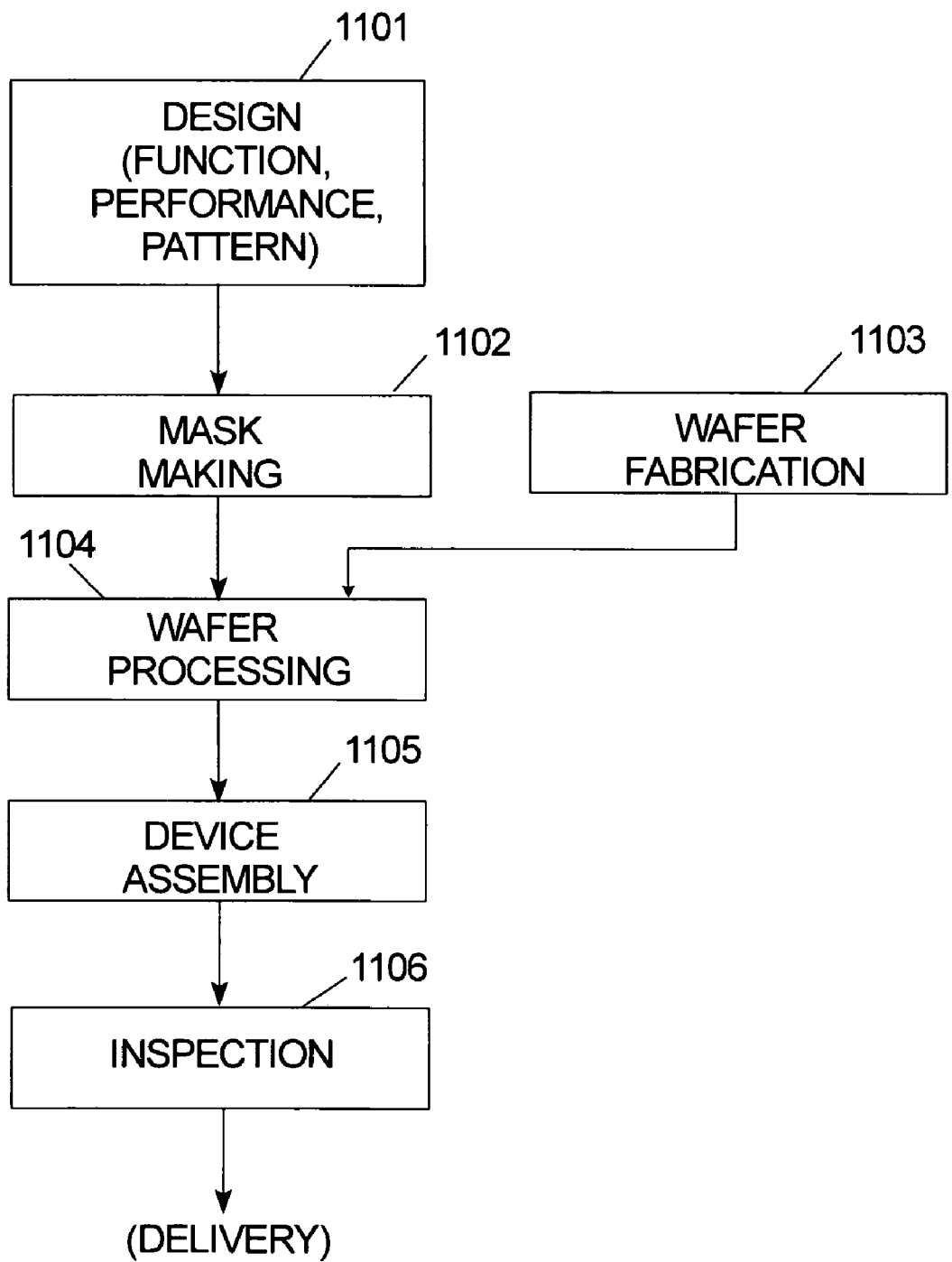
FIG. 11A is a flow chart that outlines a process for manufacturing a device in accordance with the present invention.

Further, semiconductor devices can be fabricated using the above described systems, by the process shown generally in FIG. 11A. In step 1101 the device's function and performance characteristics are designed. Next, in step 1102, a mask (reticle) having a pattern is designed according to the previous designing step, and in a parallel step 1103 a wafer is made from a silicon material. The mask pattern designed in step 1102 is exposed onto the wafer from step 1103 in step 1104 by a photolithography system described hereinabove in accordance with the present invention. In step 1105 the semiconductor device is assembled (including the dicing process, bonding process and packaging process), finally, the device is then inspected in step 1106.

Figure 11B:
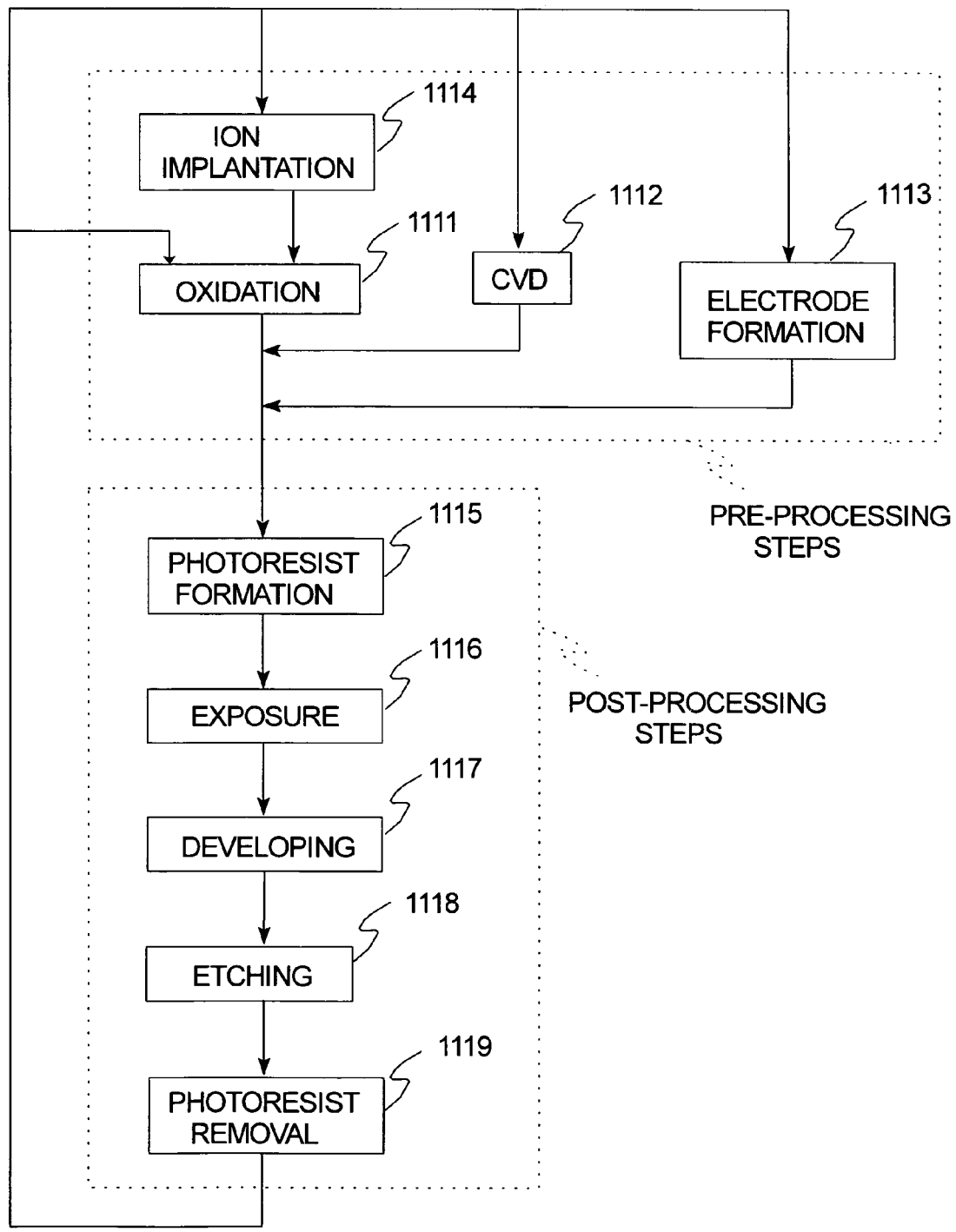
FIG. 11B is a flow chart that outlines device processing in more detail.

FIG. 11B illustrates a detailed flowchart example of the above-mentioned step 1104 in the case of fabricating semiconductor devices. In FIG. 11B, in step 1111 (oxidation step), the wafer surface is oxidized. In step 1112 (CVD step), an insulation film is formed on the wafer surface. In step 1113 (electrode formation step), electrodes are formed on the wafer by vapor deposition. In step 1114 (ion implantation step), ions are implanted in the wafer. The above mentioned steps 1111–1114 form the preprocessing steps for wafers during wafer processing, and selection is made at each step according to processing requirements.

At each stage of wafer processing, when the above-mentioned preprocessing steps have been completed, the following post-processing steps are implemented. During post-processing, first, in step 1115 (photoresist formation step), photoresist is applied to a wafer. Next, in step 1116 (exposure step), the above-mentioned exposure device is used to transfer the circuit pattern of a mask (reticle) to a wafer. Then in step 1117 (developing step), the exposed wafer is developed, and in step 1118 (etching step), parts other than residual photoresist (exposed material surface) are removed by etching. In step 1119 (photoresist removal step), unnecessary photoresist remaining after etching is removed.

Multiple circuit patterns are formed by repetition of these preprocessing and post-processing steps.

While the particular mover combination 34 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mover for use with a circulation system that provides a source of pressurized fluid, the mover comprising:
   a magnet array;
   a conductor array that interacts with the magnet array when electrically excited; and
   a circulation housing that is secured to one of the arrays and cooperates with at least one of the arrays to define a fluid passageway near the conductor array, the circulation housing including a first wall having a wall thickness, wherein the wall thickness at a first position of the first wall is different than the wall thickness at a second position of the first wall, wherein the size of the fluid passageway at the first position is different than the size of the fluid passageway at the second position while no fluid is being directed through the fluid passageway, and wherein the size of the fluid passageway at the first position is approximately egual to the size of the passageway at the second position while fluid is being directed through the fluid passageway.

2. The mover of claim 1 wherein the first wall includes a curved region and the shape of the curved region is different at the first position than at the second position.

3. The mover of claim 2 wherein the first wall includes a first end and wherein the wall is substantially straight at the first end.

4. The mover of claim 2 wherein the curved region is convex shaped.

5. The mover of claim 2 wherein the curved region is concave shaped.

6. The mover of claim 1 wherein a cross-sectional shape of the first wall at the first position is different from the cross-sectional shape of the wall at the second position.

7. The mover of claim 1 wherein the wall thickness at the first position is at least approximately 0.2 millimeters different from the wall thickness at the second position.

8. The mover of claim 1 wherein the wall thickness at the first position is at least approximately 1 millimeter different from the wall thickness at the second position.

9. The mover of claim 1 wherein the wall thickness at the first position is at least approximately 5 percent different from the wall thickness at the second position.

10. The mover of claim 1 wherein the wall thickness at the first position is at least approximately 50 percent different from the wall thickness at the second position.

11. The mover of claim 1 wherein the circulation housing includes a second wall, wherein the first wall and the second wall are fabricated as an integral unit.

12. The mover of claim 11 further comprising a third wall, wherein the first wall, the second wall and the third wall are fabricated as an integral unit.

13. The mover of claim 1 wherein the wall is made of a fiber reinforced composite.

14. The mover of claim 13 wherein the composite is a carbon fiber reinforced polymer.

15. The mover of claim 1 wherein the conductor array includes a heat transferer and a retainer passageway.

16. The mover of claim 1 wherein the circulation housing cooperates with at least one of the arrays to define a second fluid passageway that at least partly encircles the fluid passageway.

17. The mover of claim 1 wherein the circulation housing includes a second wall that is approximately parallel to the first wall and wherein the shape of the second wall is different from the shape of the first wall.

18. A mover combination including the mover of claim 1 and a circulation system that directs a fluid into the circulation housing.

19. The mover combination of claim 18 wherein the fluid directed into the circulation housing deflects the first wall so that an outer surface of the first wall is substantially planar.

20. An isolation system including the mover of claim 1.

21. A stage assembly including the mover of claim 1.

22. An exposure apparatus including the mover of claim 1.

23. An object on which an image has been formed by the exposure apparatus of claim 22.

24. A semiconductor wafer on which an image has been formed by the exposure apparatus of claim 22.

25. A mover combination comprising:
   a circulation system that provides a source of pressurized fluid; and a mover including a magnet array, a conductor array, and a circulation housing that is secured to one of the arrays and cooperates with at least one of the arrays to define a fluid passageway near the conductor array, the circulation housing including a first wall having an outer surface, wherein, the outer surface includes a curved region when the pressurized fluid is not directed into the fluid passageway and wherein the curved region is deflected to be substantially planar shaped when pressurized fluid is directed into the fluid passageway.

26. The mover combination of claim 25 wherein the shape of the curved region is different at a first position than at a second position.

27. The mover combination of claim 25 wherein the first wall has a wall thickness, wherein the wall thickness at a first position of the first wall is different than the wall thickness at a second position of the first wall.

28. The mover combination of claim 27 wherein the first wall includes a first end and wherein the first wall is substantially straight at the first end.

29. The mover combination of claim 27 wherein a cross-sectional shape of the first wall at the first position is different from a cross-sectional shape of the first wall at the second position.

30. The mover combination of claim 27 wherein the wall thickness at the first position is at least approximately 0.2 millimeters different from the wall thickness at the second position.

31. The mover combination of claim 27 wherein the wall thickness at the first position is at least approximately 1 millimeter different from the wall thickness at the second position.

32. The mover combination of claim 27 wherein the wall thickness at the first position is at least approximately 5 percent different from the wall thickness at the second position.

33. The mover combination of claim 27 wherein the wall thickness at the first position is at least approximately 50 percent different from the wall thickness at the second position.

34. The mover combination of claim 25 wherein the circulation housing includes a second wall, wherein the first wall and the second wall are fabricated as an integral unit.

35. The mover combination of claim 25 further comprising a third wall, wherein the first wall, the second wall and the third walls are fabricated as an integral unit.

36. The mover combination of claim 25 wherein the first wall is made of a fiber reinforced composite.

37. The mover of claim 36 wherein the composite is a carbon fiber reinforced polymer.

38. An isolation system including the mover combination of claim 25.

39. A stage assembly including the mover combination of claim 25.

40. An exposure apparatus including the mover combination of claim 25.

41. An object on which an image has been formed by the exposure apparatus of claim 40.

42. A semiconductor wafer on which an image has been formed by the exposure apparatus of claim 40.

43. A mover comprising:
a magnet array;
a conductor array that interacts with the magnet array when electrically excited; and
a circulation housing that is secured to one of the arrays and cooperates with at least one of the arrays to define a fluid passageway near the conductor array, the circulation housing including a first wall having a curved region, wherein the shape of the curved region at a first position of the first wall is different than the shape of the curved region at a second position of the first wall.

44. The mover of claim 43 wherein the first wall includes a first end and wherein the wall is substantially straight at the first end.

45. The mover of claim 43 wherein the curved region is convex shaped.

46. The mover of claim 43 wherein the curved region is concave shaped.

47. The mover of claim 43 wherein a cross-sectional shape of the first wall at the first position is different from the cross-sectional shape of the wall at the second position.

48. The mover of claim 43 wherein a wall thickness at the first position is at least approximately 0.2 millimeters different from a wall thickness at the second position.

49. The mover of claim 48 wherein the wall thickness at the first position is at least approximately 50 percent different from the wall thickness at the second position.

50. The mover of claim 43 wherein the circulation housing includes a second wall, wherein the first wall and the second wall are fabricated as an integral unit.

51. The mover of claim 43 wherein the wall is made of a fiber reinforced composite.

52. The mover of claim 51 wherein the composite is a carbon fiber reinforced polymer.

53. The mover of claim 43 wherein the conductor array includes a heat transferer and a retainer passageway.

54. The mover of claim 43 wherein the circulation housing cooperates with at least one of the arrays to define a second fluid passageway that at least partly encircles the fluid passageway.

55. A mover combination including the mover of claim 43 and a circulation system that directs a fluid into the circulation housing.

56. The mover combination of claim 55 wherein the fluid directed into the circulation housing deflects the first wall so that an outer surface of the first wall is substantially planar.

57. An isolation system including the mover of claim 43.

58. A stage assembly including the mover of claim 43.

59. An exposure apparatus including the mover of claim 43.

60. A method for circulating a fluid from a fluid source to a mover, the mover including a magnet array and a conductor array, the method comprising the step of:
securing a circulation housing to one of the arrays, the circulation housing cooperating with at least one of the arrays to define a fluid passageway near the conductor array, the circulation housing including a first wall having a wall thickness, wherein the wall thickness at a first position of the first wall that is different than the wall thickness at a second position of the first wall, wherein the size of the fluid passageway at the first position is different than the size of the fluid passageway at the second position while no fluid is being directed through the fluid passageway, and wherein the size of the fluid passageway at the first position is approximately equal to the size of the passageway at the second position while fluid is being directed through the fluid passageway.

61. The method of claim 60 wherein a cross-sectional shape of the first wall at the first position is different from a cross-sectional shape of the first wall at the second position.

62. The method of claim 60 wherein the wall thickness at the first position is at least approximately 0.2 millimeters different from the wall thickness at the second position.

63. The method of claim 60 wherein the wall thickness at the first position is at least approximately 1 millimeters different from the wall thickness at the second position.

64. The method of claim 60 wherein the wall thickness at the first position is at least approximately 5 percent different from the wall thickness at the second position.

65. The method of claim 60 wherein the wall thickness at the first position is at least approximately 50 percent different from the wall thickness at the second position.

66. The method of claim 60 wherein the circulation housing includes a second wall, and wherein the first wall and the second wall are fabricated as an integral unit.

67. The method of claim 66 wherein the circulation housing includes a third wall and wherein the first wall, the second wall and the third wall are fabricated as an integral unit.

68. The method of claim 60 further comprising the step of directing the fluid into the fluid passageway to deflect the first wall so that an outer surface of the first wall is substantially planar.

69. The method of claim 68 further comprising the step of controlling the rate of flow of the fluid so that the outer surface of the first wall is substantially flat.

70. A method for making an isolation system comprising the steps of providing a mover and circulating the fluid within the mover pursuant to the method of claim 60.

71. A method for making a stage assembly comprising the steps of providing a stage, providing a mover that moves the stage, and circulating the fluid within the mover pursuant to the method of claim 60.

72. A method for making an exposure apparatus comprising the steps of providing an illumination source, providing a mover, and circulating the fluid within the mover pursuant to the method of claim 60.

73. A method of making a wafer utilizing the exposure apparatus made by the method of claim 72.

74. A method of making a device utilizing the exposure apparatus made by the method of claim 72.

75. A mover comprising:
a magnet array;
a conductor array that interacts with the magnet array when electrically excited; and
a circulation housing that is secured to one of the arrays and cooperates with at least one of the arrays to define a fluid passageway near the conductor array, the circulation housing including a first wall having a wall thickness, wherein the wall thickness at a first position of the first wall is different than the wall thickness at a second position of the first wall, wherein the first wall includes a curved region and the shape of the curved region is different at the first position than at the second position.

76. The mover of claim 75 wherein the first wall includes a first end and wherein the wall is substantially straight at the first end.

77. The mover of claim 75 wherein the curved region is convex shaped.

78. The mover of claim 75 wherein the curved region is concave shaped.

79. A mover comprising:
a magnet array;
a conductor array that interacts with the magnet array when electrically excited, wherein the conductor array includes a heat transferer and a retainer passageway; and
a circulation housing that is secured to one of the arrays and cooperates with at least one of the arrays to define a fluid passageway near the conductor array, the circulation housing including a first wall having a wall thickness, wherein the wall thickness at a first position of the first wall is different than the wall thickness at a second position of the first wall.

80. A mover comprising:
a magnet array;
a conductor array that interacts with the magnet array when electrically excited; and
a circulation housing that is secured to one of the arrays and cooperates with at least one of the arrays to define a fluid passageway near the conductor array, the circulation housing including a first wall having a wall thickness, wherein the wall thickness at a first position of the first wall is different than the wall thickness at a second position of the first wall, wherein the circulation housing cooperates with at least one of the arrays to define a second fluid passageway that at least partly encircles the fluid passageway.

81. A mover comprising:
a magnet array;
a conductor array that interacts with the magnet array when electrically excited; and
a circulation housing that is secured to one of the arrays and cooperates with at least one of the arrays to define a fluid passageway near the conductor array, the circulation housing including a first wall having a wall thickness, wherein the wall thickness at a first position of the first wall is different than the wall thickness at a second position of the first wall, wherein the fluid directed into the circulation housing deflects the first wall so that an outer surface of the first wall is substantially planar.

82. A method for circulating a fluid from a fluid source to a mover, the mover including a magnet array and a conductor array, the method comprising the steps of:
securing a circulation housing to one of the arrays, the circulation housing cooperating with at least one of the arrays to define a fluid passageway near the conductor array, the circulation housing including a first wall having a wall thickness, wherein the wall thickness at a first position of the first wall that is different than the wall thickness at a second position of the first wall; and
directing the fluid into the fluid passageway to deflect the first wall so that an outer surface of the first wall is substantially planar.

83. The method of claim 82 further comprising the step of controlling the rate of flow of the fluid so that the outer surface of the first wall is substantially flat.

84. A method for making an isolation system comprising the steps of:
providing a mover including a magnet array and a conductor array; and
circulating a fluid from a fluid source to the mover by securing a circulation housing to one of the arrays, the circulation housing cooperating with at least one of the arrays to define a fluid passageway near the conductor array, the circulation housing including a first wall having a wall thickness, wherein the wall thickness at a first position of the first wall that is different than the wall thickness at a second position of the first wall.

85. A method for making a stage assembly comprising the steps of:
providing a stage;
providing a mover that moves the stage, the mover including a magnet array and a conductor array; and circulating a fluid from a fluid source to the mover by securing a circulation housing to one of the arrays, the circulation housing cooperating with at least one of the arrays to define a fluid passageway near the conductor array, the circulation housing including a first wall having a wall thickness, wherein the wall thickness at a first position of the first wall that is different than the wall thickness at a second position of the first wall.

86. A method for making an exposure apparatus comprising the steps of:

providing an illumination source;

providing a mover including a magnet array and a conductor array; and circulating a fluid from a fluid source to the mover by securing a circulation housing to one of the arrays, the circulation housing cooperating with at least one of the arrays to define a fluid passageway near the conductor array, the circulation housing including a first wall having a wall thickness, wherein the wall thickness at a first position of the first wall that is different than the wall thickness at a second position of the first wall.

87. A method of making a wafer utilizing the exposure apparatus made by the method of claim 86.

88. A method of making a device utilizing the exposure apparatus made by the method of claim 86.

* * * * *

UNITED STATES PATENT AND TRADEMARK OFFICE
CERTIFICATE OF CORRECTION

PATENT NO. : 6,979,920 B2
DATED : December 27, 2005
INVENTOR(S) : Reynolds et al.

It is certified that error appears in the above-identified patent and that said Letters Patent is hereby corrected as shown below:

<u>Title page,</u>
Item [56], References Cited, FOREIGN PATENT DOCUMENTS, replace "JP 06-062788" with -- JP 06-062786 --.

Signed and Sealed this

Twenty-eighth Day of March, 2006

JON W. DUDAS
*Director of the United States Patent and Trademark Office*